United States Patent [19]

Bunch

[11] Patent Number: 4,934,798
[45] Date of Patent: Jun. 19, 1990

[54] LENS DEFLECTION SYSTEM

[76] Inventor: Jesse C. Bunch, 815 Thayer Ave., Apt. 1630, Silver Spring, Md. 20910

[21] Appl. No.: 475,890

[22] Filed: Mar. 16, 1983

[51] Int. Cl.$^5$ .......................... G02B 5/32; G02B 5/04; G02B 5/18; G02B 3/08

[52] U.S. Cl. .................................. 350/413; 350/3.72; 350/162.23; 350/162.24; 350/286; 350/451; 350/452; 350/418

[58] Field of Search ............... 350/286, 452, 451, 413, 350/418, 419, 162.23, 162.24, 3.6, 3.71, 3.72, 3.7

[56] References Cited

U.S. PATENT DOCUMENTS

| | | | |
|---|---|---|---|
| 3,580,655 | 5/1971 | Leith et al. ..................... | 350/3.6 X |
| 3,606,523 | 9/1971 | Taylor et al. ..................... | 350/418 |
| 3,698,795 | 10/1972 | Flint ................................ | 350/162.23 |
| 3,879,105 | 4/1975 | Broche et al. ..................... | 350/569 |
| 4,072,395 | 2/1978 | Mohon .............................. | 350/3.72 X |
| 4,082,433 | 4/1978 | Appeldorn et al. ............... | 350/452 |
| 4,146,306 | 3/1979 | Wallach ............................. | 350/452 |
| 4,220,400 | 9/1980 | Vizenor ............................. | 350/452 X |
| 4,307,929 | 12/1981 | Eveleth ............................. | 350/3.71 |
| 4,315,671 | 2/1982 | Bunch ............................... | 350/451 |
| 4,385,808 | 5/1983 | Vanderwerf ..................... | 350/452 |
| 4,436,398 | 3/1984 | Endo et al. ....................... | 350/162.23 X |
| 4,439,021 | 3/1984 | Gross ................................ | 350/452 X |
| 4,536,833 | 8/1985 | Davis ................................ | 350/3.72 |
| 4,691,994 | 9/1987 | Afian et al. ....................... | 350/3.7 X |

OTHER PUBLICATIONS

Ludman, J. E.; "Holographic Solar Concentrator"; *Applied Optics;* vol. 21, No. 17; Sep. 1, 1982; pp. 3057–3058.

*Primary Examiner*—Scott J. Sugarman
*Attorney, Agent, or Firm*—Lane & Aitken

[57] ABSTRACT

A lens deflection system (10) for deflecting radiation emitted from a source. The lens deflection system (10) provides for the varying of the index of refraction of system (10) as a function of location and/or time. Incoming radiation may initially impinge on a planar surface (12) forming a frontal face of system (10) and pass internal to a first radiation transmissive mechanism which may be a plurality of prisms (18, 18' and 18"). The radiation may be deflected upon entering prisms (18, 18' and 18") and then may be further deflected upon passage through rear surfaces (14, 14' and 14") upon entrance into base element (28) which may serve as a second radiation transmissive mechanism. By adjusting the indices of refraction of the prisms (18, 18' and 18") and/or the base element (28), the radiation may be deflected in a predetermined manner.

54 Claims, 11 Drawing Sheets

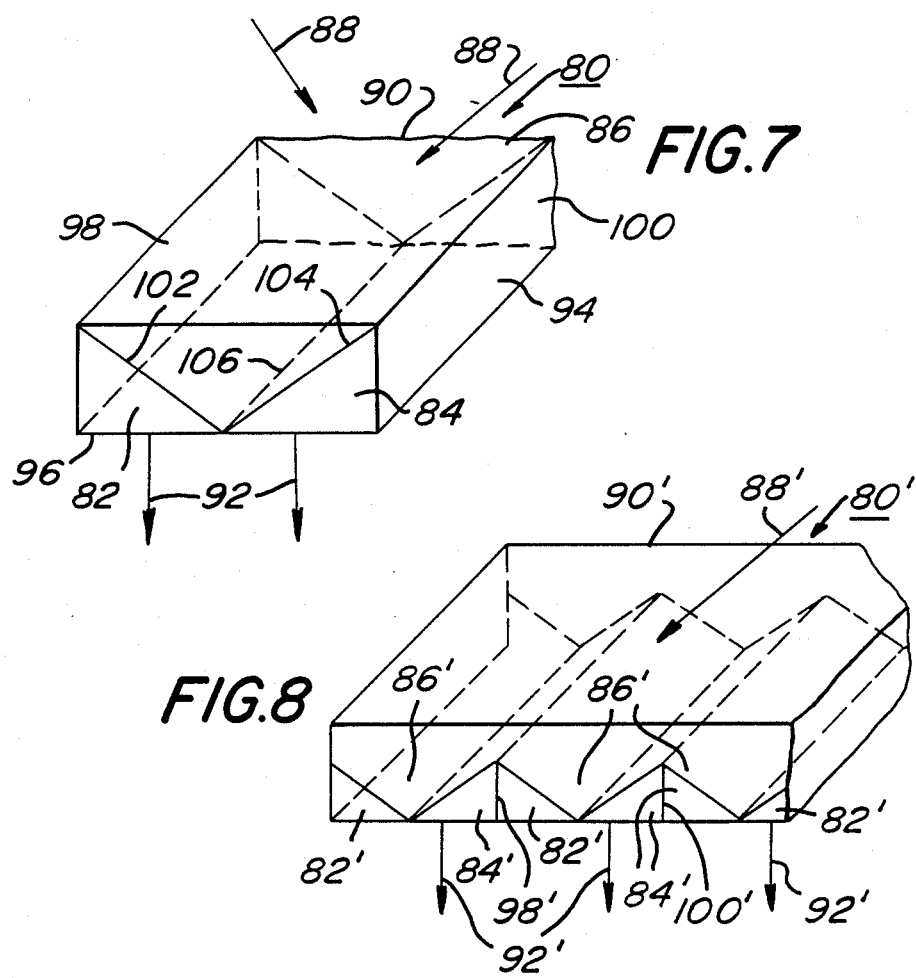
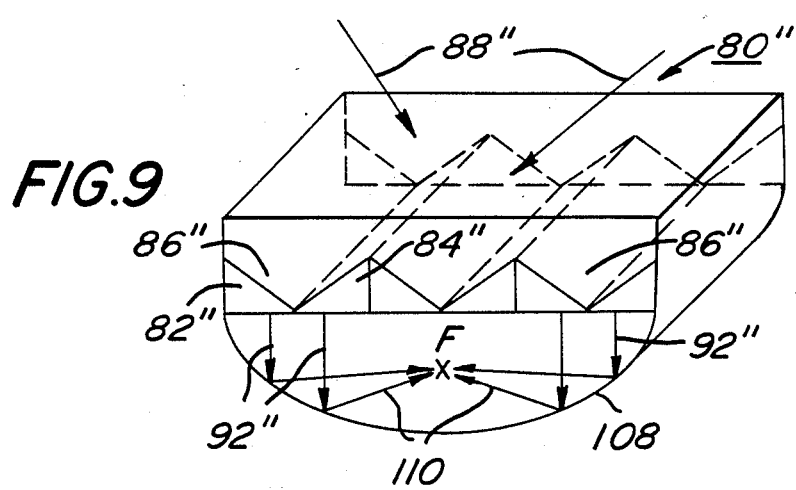

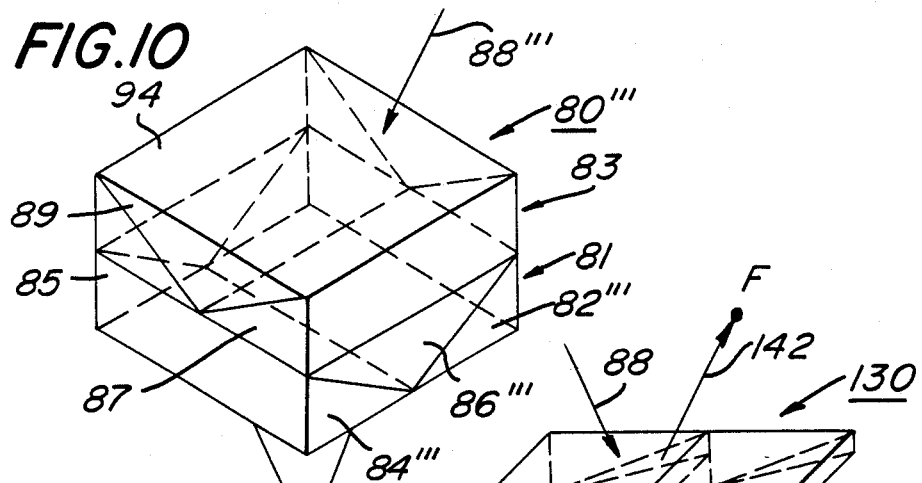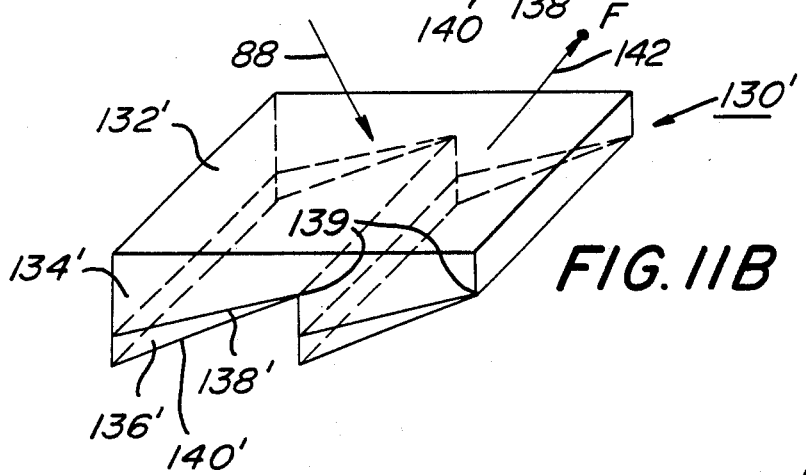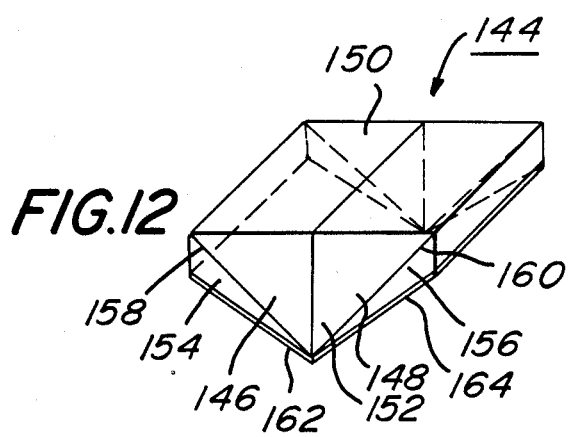

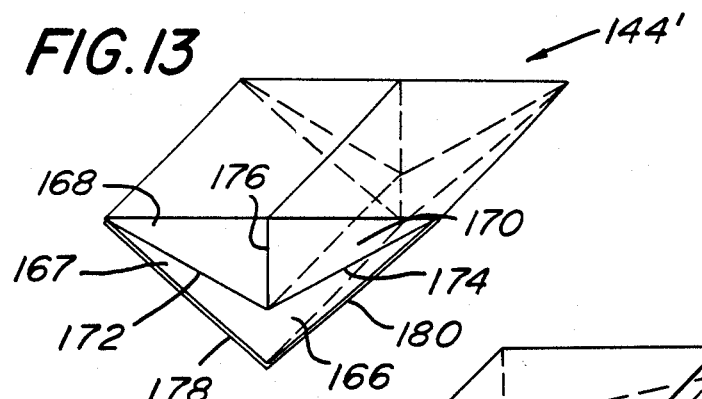
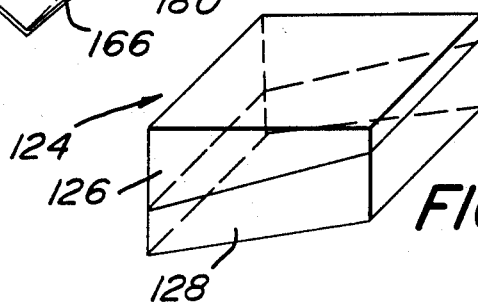
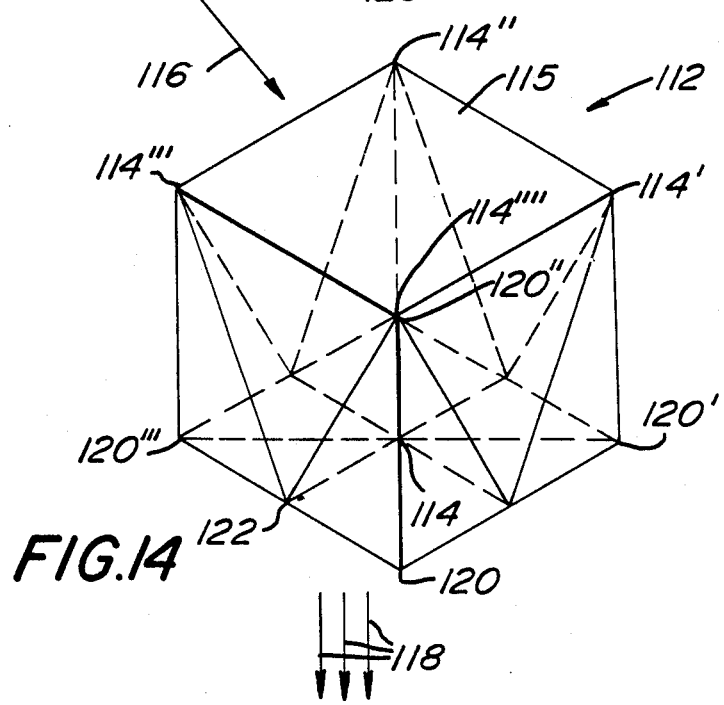

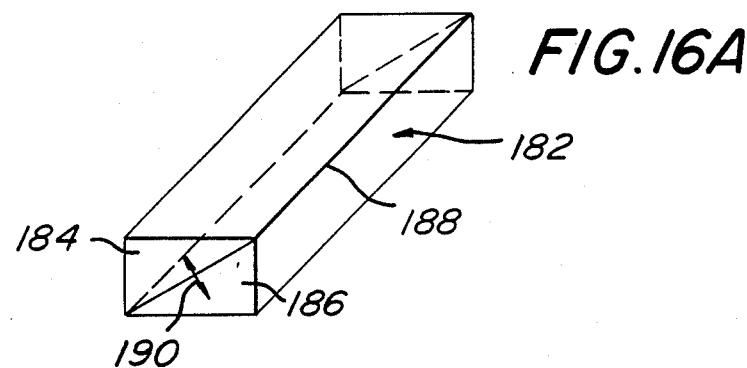
FIG.16A
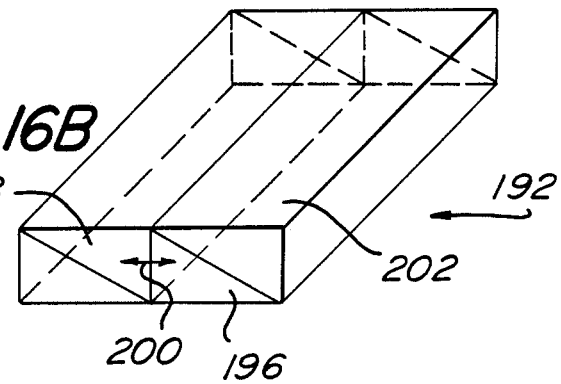
FIG.16B
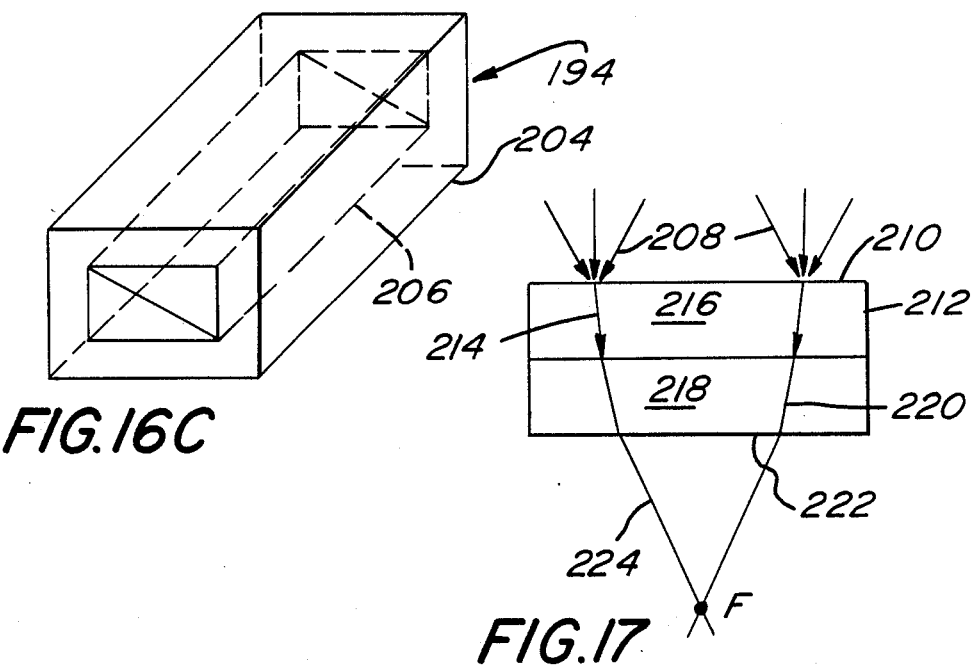
FIG.16C
FIG.17

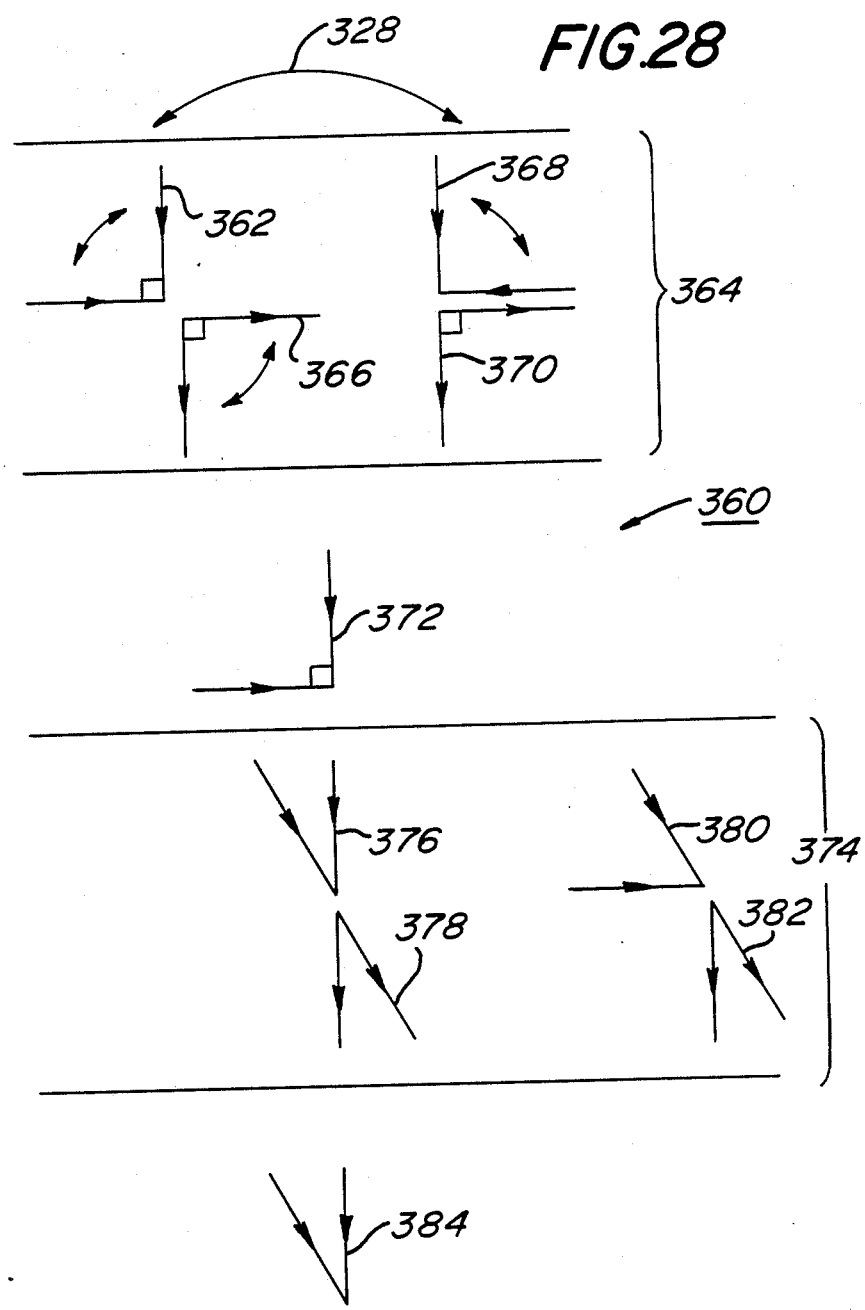

LENS DEFLECTION SYSTEM

BACKGROUND OF THE INVENTION

1. Field of the Invention

This invention pertains to radiation deflection systems. In particular, this invention relates to radiation reflection systems having varying indices of refraction. More in particular, this invention relates to lens deflection systems wherein the index of refraction of the system may be varied with respect to time or positional location. Still further, this invention relates to lens deflection systems having heliostat like optical qualities for tracking a displaceable source. Additionally, in some embodiments, this invention pertains to a holographic type heliostat system.

2. Prior Art

Lens deflection systems are known in the art. Additionally, lens deflection systems for deflecting incoming radiation through refraction, reflection, difraction, and combinations thereof are also known. However, the concept of a lenticulated lens deflection system being provided with the capability of a varying index of refraction as a function of time, and/or location within the structure of the lens deflection system is not believed to be known.

The closest prior art known to Applicant is U.S. Pat. No. 3,606,523, which provides for a lens deflection system wherein the index of refraction may be discretely changed as a function of time. However, such prior art does not provide for a lenticulated system to provide the specific radiation deflection mechanism of the subject inventive concept.

SUMMARY OF THE INVENTION

A lens deflection system for deflecting radiation emitted from a source. The lens deflection system includes a first radiation mechanism for transmissively directing the radiation. A second radiation transmissive mechanism transmissively directs the radiation and the overall lens deflection system is adapted to provide a varying index of refraction for the radiation passing internal the first and second radiation transmissive mechanisms. At least one of the first and second radiation transmissive mechanisms includes a pair of at least partially transmissive prism members.

BRIEF DESCRIPTION OF THE DRAWINGS

FIG. 6 is a perspective view of a bi-prism lens deflection system showing interface of a base member with a plurality of prism members;

FIG. 7 is a perspective, partially cut-away view of a tri-prism lens deflection system;

FIG. 8 is a partially cut-away perspective view of an embodiment of a tri-prism lens deflection system;

FIG. 9 is a perspective view of a tri-prism lens deflection system embodiment including a focusing element to focus radiation rays to a point or line;

FIG. 10 is a perspective view of a tri-prism lens deflection system showing a pair of layers in crossed contiguous contact;

FIG. 11A shows an embodiment of a bi-prism lens deflection system having discrete index of refraction volumes formed therein;

FIG. 11B is a perspective view of an embodiment of the lens deflection system shown in FIG. 11A;

FIG. 12 is a perspective view of an embodiment of a bi-prism lens deflection system showing a reflective rear surface;

FIG. 13 is an embodiment of the lens deflection system showing a tri-prism element formation having a reflective rear surface;

FIG. 14 is a perspective view of an embodiment of the lens deflection system having a radiation transmissive member in the form of a tetrahedra;

FIG. 15 is a perspective view of an embodiment of the lens deflection system showing an inclined interface between a pair of radiation transmissive members;

FIG. 16A is a perspective view of a lens deflection system showing transport across an inclined interface boundary between a pair of prism members;

FIG. 16B is a perspective view of a pair of prism member sets showing material transport across a boundary of a pair of prism members;

FIG. 16C is a perspective view of an embodiment of the lens deflection system showing a pair of prism members within an outer boundary volume for passage of a predetermined composition across the boundary surfaces of the prism members;

FIG. 17 is a schematic representation of a pair of focusing systems of the lens reflection system being used as a heliostat;

DESCRIPTION OF THE PREFERRED EMBODIMENTS

Figure 1:
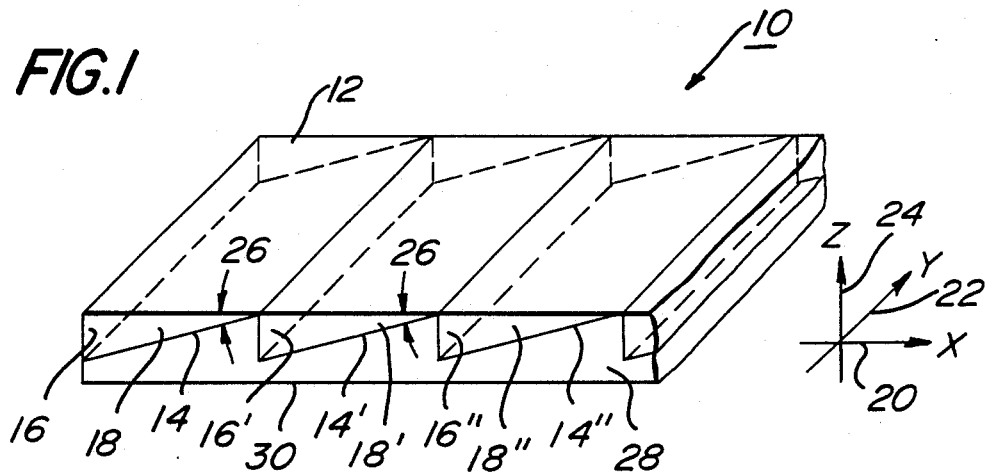
FIG. 1 is a perspective view of a linearly directed mono or bi-prism lens deflection system.
Figure 2:
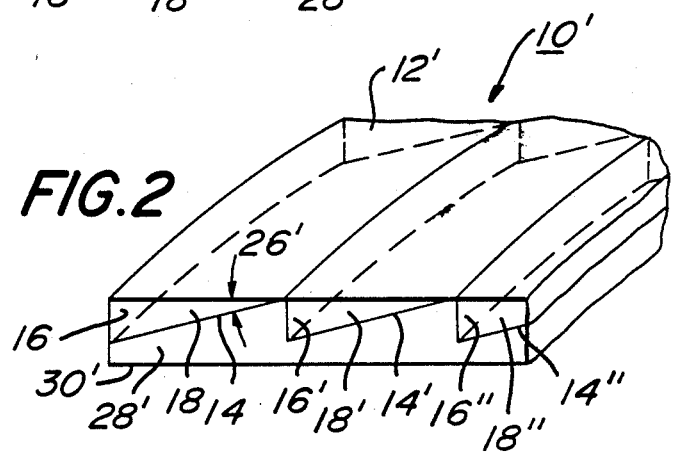
FIG. 2 is a perspective view of an arcuately directed mono or bi-prism lens deflection system.

Referring now to FIGS. 1 and 2, there is shown lens deflection or variable index concentrator systems 10 and 10'. In overall concept, systems 10 and 10' provide for a variable index of refraction as a function of either time and/or spatial considerations. Further, as will be shown in following paragraphs, systems 10 and 10' may either be a mono-prism concentrator system, or a bi-prism concentrator system dependent upon the properties chosen for the individual elements and portions thereof.

As shown in FIG. 1, lens deflection or variable index concentrator system 10 is linearly directed in longitudinal direction 20, as well as transverse direction 22. Referring to FIG. 2, variable index concentrator system 10' is arcuately directed about vertical direction 24 to generally provide an overall circular contour for system 10'.

One of the main advantages of the use of lens deflection systems 10 and 10' is that such provides for a lenticulated lens type system formed of a plurality of simple prisms 18, 18' and 18'', as shown in FIG. 1, which may be manufactured having substantially equal lenticulated lens angles 26. By providing a system wherein substantially equal lenticulated angles 26 exist, such provides for ease and rapidity of manufacture leading to a lower cost system.

In general concept, lens deflection system 10 includes first radiation transmissive mechanisms which may be prisms 18, 18' and 18''. Additionally, base element 28 may be considered as a second radiation transmissive mechanism with system 10 being adapted to provide a varying index of refraction for radiation internal the first and second transmissive mechanisms.

By providing a change in the index of refraction between various prisms 18, 18' and 18'', the focus of the overall system 10 or 10' may be changed at the discretion of the user. It is to be understood that prisms 18, 18' and 18'' may have an internal distribution of indices of refraction and that one index of refraction is not necessarily a function of a particular prism 18, 18' and 18''. Thus, a singular prism such as 18 may in itself be divided into discrete volumes having individual indices of refraction, or in the alternative, the index of refraction for a particular prism such as prism 18, may be of a continuously varying value as a function of the spatial relation of such prisms.

As will be seen in following paragraphs, the index of refraction of prisms 18, 18' and 18'' may be changed as a function of spatial relation in directions 20 or 22, as well as a function of time. Thus, the overall concept of systems 10 and 10' is directed to the provision of a variable index of refraction in accordance with the following equations:

$$N^i = f(x, y, z) \quad (1)$$

$$N^i = f(t) \quad (2)$$

$$N^i = f(x, y, z, t) \quad (3)$$

where:

$N^i$ = index of refraction of $i^{th}$ prism x = longitudinal direction (20)
y = transverse direction (22)
z = vertical direction (24)
t = time Referring now to equation (1) showing that the index of refraction for prisms 18, 18' and 18'' are a function of spatial relations, such may be formed by composing associated prisms 18, 18' and 18'' of a solid, substantially transparent plurality of materials such as plastic compositions. Each of elements 18, 18' and 18'' may have a particular index of refraction, or have a varying index of refraction internal to each of prism elements 18, 18' and 18''.

In the representative structures shown, prisms 18, 18' and 18'' provide for a generally planar surface 12 and a rear inclined surface 14 having a vertical lenticulation boundary wall 16, 16' and 16''.

In well-known manufacturing techniques, prism elements 18, 18' and 18'' may be formed in a mold, through an extrusion process, or some like technique, not important to the inventive concept as is herein described. By changing the composition of the solid, substantially transparent materials forming the simple prisms 18, 18' and 18'', the user has the ability of providing a variable focus well-known in the art. Additionally, by providing substantially equal lenticulation angles 26, overall variable index concentrator systems 10 increase the ease and cost of manufacture.

The lower portion of variable index concentrator system 10 as shown in FIG. 1, includes base element 28 which is formed of a substantially transparent solid material composition such as plastic or some like material. In the event that base element 28 has an index of refraction equal to the surrounding environment of concentrator system 10, then variable index concentrator system 10 becomes a mono-prism variable index concentrator system. Where base element 28 includes an index of refraction which is not equal to the ambient environment index of refraction, then there is produced a bi-prism variable index concentrator system.

In either case, base element 28 generally interfaces with prisms 18, 18' and 18'' along rear inclined surfaces 14, 14' and 14'' and vertical lenticulation boundary walls 16, 16' and 16''. Lower base element surface 30 of element 28 is generally planar in contour when taken with respect to a plane formed by the X, Y coordinates defined by longitudinal and transverse directions 20 and 22.

As is clearly evident, base element surface 30 may be mirror coated in order to provide a positive variable focus. Where base element 28 is formed of a substantially transparent material composition, an incoming ray of electromagnetic radiation from an external source may be refracted at frontal planar surface 12 if such is positionally located at an angle other than normal to the incoming ray. When the ray is normal to frontal planar surface 12, such ray merely passes through surface 12 and impinges on rear inclined surfaces 14, 14' and 14''. The ray is then refracted if indices or refraction associated with prisms 18, 18' and 18'' are different in value from base element 28.

The possibly refracted ray then passes through base element surface 30 and is once again refracted, where base element surface 28 has a differing index of refraction that the ambient environment. The ray then impinges on a predetermined focus point. As the indices of refraction of prisms 18, 18' and 18'' are changed and varied, the angle of refraction is also responsively varied and a changing or variable focus may be achieved.

Figure 5:
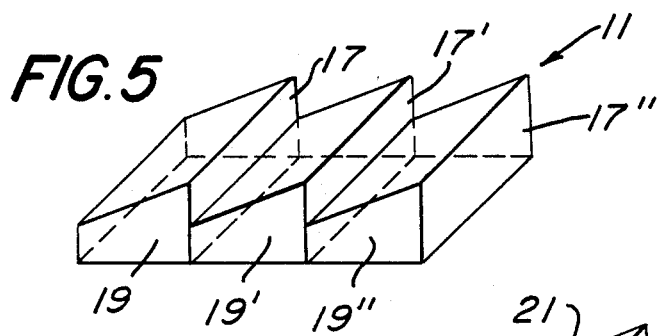
FIG. 5 is a perspective view of an embodiment of a mono-prism lens deflection system showing interaction of one prism member with a boundary wall surface of an adjacent prism member.

With this type of configuration, the positioning of the focus is dependent upon the indices of refraction of prisms 18, 18' and 18", as well as base element 28. Thus, during a molding process with the proper choice of material compositions, a particularly positioned focus may be achieved or manufactured into the formation of variable index concentrator system 10. It is to be clearly understood that mixtures of materials may be used to provide varying focus points and in fact, the index of refraction is not a function of the lenticulations themselves, but rather may be formed in a continuously varying pattern within prism elements 18, 18' and 18", or may have a discrete variation of the index of refraction within a particular prism element. Where concentrator system 10 or 10' is formed of solid prism elements, the index or refraction is a function of the coordinates X, Y and Z. Referring now to FIG. 5, there is shown monoprism concentrator system 11 which is used as an exemplary figure in order to more specifically show that prism elements 19, 19' and 19" need not be directed to a triangular cross-sectional contour as is shown in FIGS. 1 and 2. As can be seen, lenticulation walls 17, 17' and 17" extend beyond a next succeeding prism element volumetric contour and provide for a substantially non-triangular overall mounting base.

As has been stated in previous paragraphs, prism elements may include a continuous index of refraction value within the particular prism element, or may be formed having discrete indices of refraction. In the embodiment shown in FIG. 5A, there is seen a plurality of prism elements 21, 21' and 21" with each of the prism elements having discrete index or refraction volumes 23, 25, 27, 29, 31, and 33. In this embodiment, prism element 21 is divided into two discrete element areas having individual indices of refraction associated respectively with prism element volumes 23 and 25.

Figure 5A:
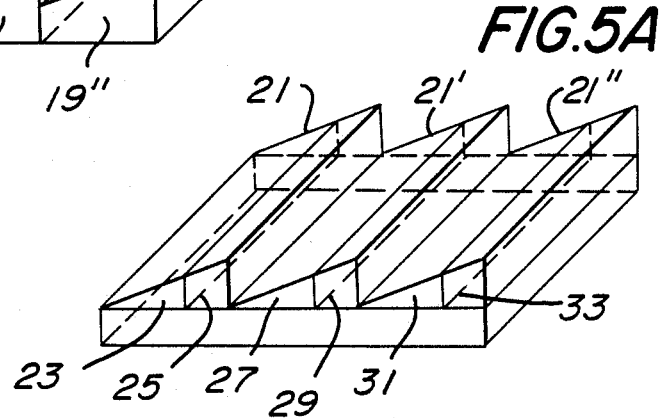
Figure 6:
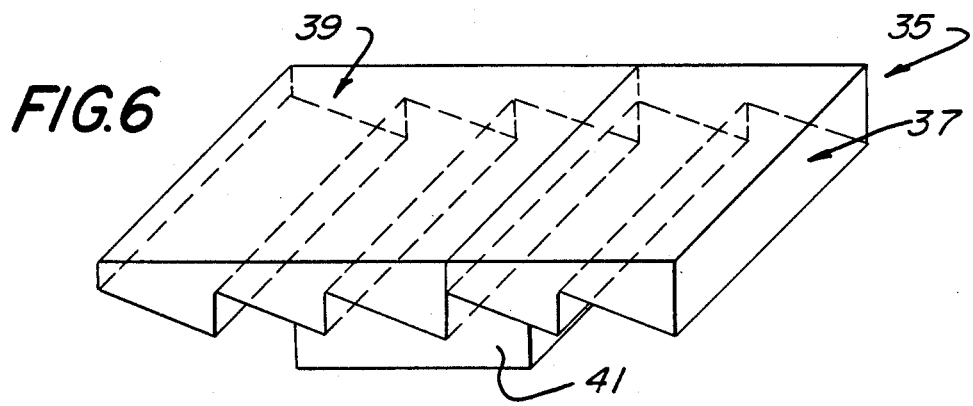
FIG. 6 is a perspective view of a mono or bi-prism lens deflection system showing discrete index of refraction changes within individual prism members.

FIG. 6 directs itself to bi-prism concentrator system 35 being formed of an overall pair of upper prisms 37 and 39 in mating interface with lower prism element 41. Obviously, a plurality of lower prisms 41 may be matingly engaged to a series of upper prisms 37 and 39 extended in longitudinal direction 20, as well as the transverse direction 22. In this embodiment, upper prisms 39 and 37 may have an individual index of refraction associated with each prism element which may be differing in value from lower prism element 41. FIGS. 5, 5A, and 6 are all directed to other variations of the basic concept explained and described for the systems of FIGS. 1 and 2.

Returning now to energy concentrator system 10' as shown in FIG. 2, such is formed arcuately about vertical direction 24. Arcuately directed variable index concentrator system 10' is a function of the coordinate axes and the index of refraction of the various prisms 18, 18' and 18", and may follow in general equation (1), as previously described. Where lower base element 28' includes the same index of refraction as the surrounding environment, then concentrator system 10' becomes a mono-prism element concentrator system, however, when base element 28' has a differing index of refraction when taken with respect to the surrounding environment, system 10' is of the nature of a bi-prism concentrator system.

When prisms 18, 18' and 18" are solidly formed of materials whether of a mixture of materials, or of a discrete material, such may be provided to include a variable focus.

Arcuate variable index concentrator system 10' provides for frontal planar surface 12' and rear inclined surfaces 14, 14' and 14" in the same manner as that provided for the embodiments shown in FIG. 1. Prisms 18, 18' and 18" include rear vertical or substantially vertical lenticulation boundary walls 16, 16' and 16" and are generally formed of substantially transparent compositions which may be individual in nature with respect to a next succeeding index of refraction for a next succeeding prism. In general, lenticulation angles 26' may be equal each to the other to allow for ease of manufacture, since prism elements 18, 18' and 18" when in a solid configuration are generally formed in a molding or extrusion process.

Arcuately directed variable index concentrator system 10' includes arcuately directed base element 28' which may be formed of a transparent or substantially transparent material composition which may or may not have the same index of refraction associated with a particular prism 18, 18' and 18". Base element surface 30' forms the lower boundary of concentrator system 10' and may be generally planar in contour with respect to coordinate axes X, Y. Base element surface 30' may additionally have a mirror coating for reflection of refracted rays, as was seen in the embodiment shown in FIG. 1, or may be transparent in optical properties to provide passage of refracted rays therethrough. In the same conceptual manner as shown for concentrator system 10, concentrator system 10' may thus allow for variable focus arrangements either to provide a reflected focus, or a focus on opposing sides of concentrator system 10' when taken with respect to an external radiation source.

Referring now to further embodiments of variable index concentrator systems 10 and 10', there is to be described in following paragraphs, a conceptual change batween a solid configuration as has been previously described in FIGS. 1 and 2. However, the FIGS. 1 and 2 structural representations are substantially identical and will be used for descriptionh purposes.

The conceptual change or variation is to provide a varying index of refraction for concentrator systems 10 and 10' as a function of coordinate axes X, Y, Z, as well as time. The description as herein provided relates both to either linear concentrator systems 10, or to arcuately directed concentrator systems 10'.

In the embodiment under discussion, prisms 18, 18' and 18" may now be chambers having upper frontal planar surface 12, rear inclined surfaces 14, 14' and 14", as well as substantially vertical lenticulation boundary walls 16, 16' and 16". Prism chambers 18, 18' and 18" may now be filled with particular fluids having discrete indices of refraction, or may be filled with the same type of optical property fluid. The important concept is that prism chambers 18, 18' and 18" are individual chamber members which may be filled with particular index of refraction fluids.

Base element 28 as in the previous embodiment detailed, may be a transparent member formed of a susbstantially transparent or translucent type material having varying compositions of materials such as combinations of plastic, and provides base element surface 30 for further refraction of rays passing therethrough.

Lenticulation angles 26 of prism chambers 18, 18' and 18" may be maintained substantially constant throughout the extended radial length of concentrator system 10', or throughout the linear length of concentrator system 10. In this manner, by changing fluids in prism chambers 18, 18' and 18", the user may change the focus length and position as a function of coordinate axes responsive to individual needs, as associated with a particular use.

An important consideration in this concept embodiment is that prism chambers 18, 18' and 18" are formed by closed contour interfacing sections 12, 16 and 14 to provide prism chambers 18, 18', or 18", having discrete indices of refraction. Thus, by changing the liquid contents of the prism chambers 18, 18' and 18", variable foci may be achieved at the behest of the user for a predetermined function. In a broad sense, this concept allows the indices of refraction to be changed over a time interval as a function of a particular objective.

However, in general, this embodiment is directed once again to a change of the indices of refraction as a function of the coordinate axes. In most cases, such prism chambers 18, 18' and 18" are filled with the particular fluid applicable to a specific focusing arrangement and then are sealed in a manner well-known in the art to provide a constant focus over a period of time.

Referring to the embodiment shown for concentrator system 10' in FIG. 2, it is to be understood that the term arcuately directed as applied throughout all embodiments in this invention concept not only directs itself to a circular contour, but to helical, spiral, ellipsoid or other curvilinear contours. The identical basic concepts as provided throughout this description directed to varying indices of refraction applies to a wide variety of curvilinear contours in specific systems as herein detailed.

In a still further embodiment of concentrator systems 10 and 10', reference is still made to FIGS. 1 and 2, wherein concentrator systems 10 and 10' are formed of prism chambers 18, 18' and 18", but are now immersed in a liquid contained within base element 28. In this embodiment, base element 28 is a box-like structure, impervious to fluid passage, and contains a subsequent liquid within which prism chambers 18, 18' and 18" interface along walls 16, 16' and 16", and inclined surfaces 14, 14' and 14".

The liquid contained within the chamber formed by base element 28 may be varying in nature responsive to the needs of a user. In this case, lenticulation boundary walls 16, 16' and 16" which are not optical boundaries, may be formed of a semi-permeable membrane. Through forced osmotic action, ions may be passed through boundary walls 16, 16' and 16" to the liquid contained within the lower chamber formed by base element 28. By varying electrical fields external to concentrator systems 10 and 10', ions may be shuttled back and forth across lenticulation boundary walls 16, 16' and 16" as a function of need and time. Thus, as can be seen, the indices of refraction in this case are provided as a function of both coordinate axes X, Y and Z, as well as time. For a particular use, where a changing focus must be made by the user during a particular application, the electrical fields may be varied to provide particular indices of refraction within prism chambers 18, 18' and 18" to vary such foci.

For all of the concepts previously described and directed to FIGS. 1 and 2, it is clearly seen that advantages over prior art focusing systems are readily apparent. Additionally, it is seen that concentrator systems 10 and 10" are directed to systems having substantially planar surfaces 12 and 30 which obviate the inclined lenticulation surfaces of prior art Fresnel like lenses. This aids in removing contamination from such lens systems 10 and 10'. Additionally, with the varying indices of refraction, as previously described, the concept of manufacturing systems 10 and 10" is simplified to a great degree. The lenticulation angles 26 may now be formed substantially constant with respect to the prisms or prism chambers 18, 18' and 18", as a function of the coordinate axes X, Y and Z. In this manner, manufacturing techniques are simplified and one mold may be used for different concentrator systems 10 and 10' which are directed to substantially different types of focusing. Thus, one set of geometrical functions may be used in the molding and/or other like manufacturing procedures used in forming concentrator systems 10 and 10' while such systems may have widely different focusing properties.

As has been previously described, variable index concentrator system 10 and 10' as shown in FIGS. 1 and 2 are useful in varying foci. However, such mono and bi-prism type systems 10 and 10' deal with liquids and/or solids for index refraction materials. Where a lenticulation angle 26 is provided, systems 10 and 10' only provide for a limited range of retransformation of a focus. Thus, for small changes in foci, systems 10 and 10' are extremely useful, however, where wide ranges of foci displacement must be made, systems 10 and 10' would not provide for optimum focusing.

Figure 3:
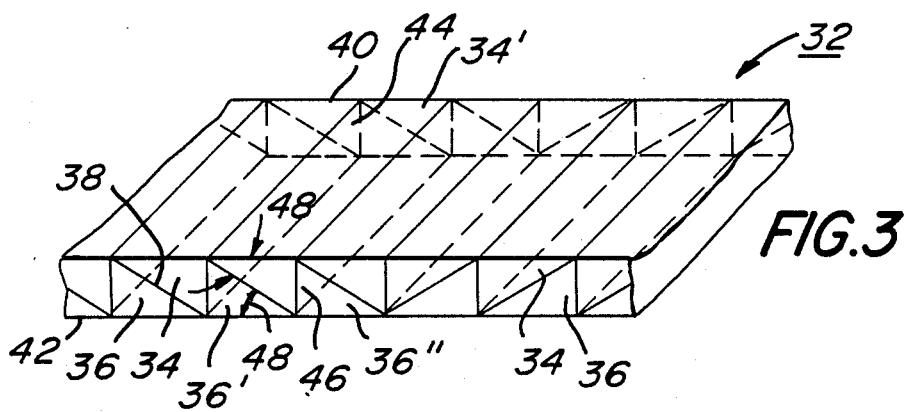
FIG. 3 is a perspective view of a linearly directed bi-prism lens deflection system.
Figure 4:
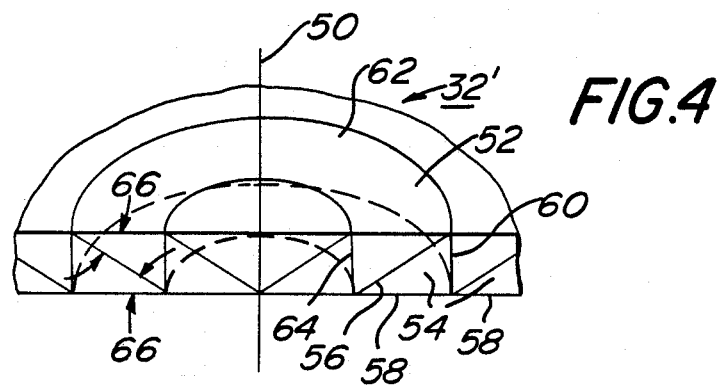
FIG. 4 is a perspective view in partial cut-away showing an arcuately directed bi-prism lens deflection system.

Referring now to FIGS. 3 and 4, there is shown bi-prism variable concentrator systems 32 and 32' which are able to increase the displacement of the refraction half deviation of a radiation ray to a substantial amount and allow for increased varying focus points and lines. As shown in FIG. 3, linear bi-prism variable concentrator system 32 includes upper bi-prism element 34 and lower bi-prism element 36 adjacent and contiguous each to the other along interfacing surface 38.

Upper bi-prism element 34 includes upper bi-prism element planar surface 40, vertical upper bi-prism element boundary wall 44, and inclined bi-prism interfacing surface 38. Lower bi-prism element 36 includes lower bi-prism element planar surface 42, vertical lower bi-prism element boundary wall 46, and inclined bi-prism interfacing surface 38.

As may be seen, upper and lower bi-prism elements 34 and 36 are formed in a somewhat Z-contour asnd in the embodiment shown in FIG. 3, a plurality of upper and lower bi-prism elements 34, and 36 extend in longitudinal direction 20. Where upper and lower planar surfaces 40 and 42 are parallel, in planes defined by X, Y coordinates defined by longitudinal and transverse directions 20 and 22, bi-prism lenticulation angles 48 are substantially equal throughout the extended length of linear bi-prism variable concentrator system 32.

Although not specifically necessary to the invention concept, having substantially parallel upper and lower planar surfaces 40 and 42 includes a plurality of advantages over prior art type systems used for focusing radiation rays. In general, planar surfaces are easily supportable by load structures where load stress factors may be simply calculated and accounted for. Additionally, planar surfaces are easily cleaned and such has an advantageous effect when variable concentrator systems 32 are exposed to an external environment. Additionally, and as will be described in following paragraphs, pluralities of combinations of upper and lower bi-prism elements 34 and 36 may be stacked wherein parallel sufaces 40 and 42 would be advantageous in the ease of stacking such bi-prism elements in vertical direction 24.

One of the most important considerations in the use of bi-prism elements 34 and 36 mounted in the manner shown in FIG. 3 is that each may have a different index of refraction. Assuming upper bi-prism element 34 has a larger index of refraction than lower bi-prism element 36, a large deflection of the incoming ray path may be achieved.

Additionally, if there exists a high deflection in one direction, and the indices are reversed between lower bi-prism element 36 and upper bi-prism element 34, the deflection is reversible about axis line 24. Thus, high degrees of deviation of the incoming radiation ray may be achieved through use of such paired upper and lower bi-prism elements 34 and 36. As has been previously discussed, upper and lower bi-prism elements 34 and 36 may have a continually varying index of refraction internal to each of elements 34 and 36, as a function of the coordinate axes within such elements as well as varying in time.

In order to finely concentrate radiation rays and to provide additional varying ranges of focusing, lower bi-prism elements 36, 36', 36", etc., may be provided with differing indices of refraction each from the other and additionally, each from upper bi-prism elements 34, 34', etc. For particular applications, the user may thus incorporate differing mixtures of liquids, gels, and/or solids to provide the focusing needs of a particular objective and purpose.

Referring now to FIG. 4, there is seen arcuate bi-prism variable concentrator system 32' which is formed of a plurality of upper and lower arcuate bi-prism elements 52 and 54, contoured in a substantially circular manner about central axis 50. It is to be understood that the embodiment shown in FIG. 4 as well as other concepts herein described, which may provide for arcuate contours, include helical, spiral, elliptical, or other curvilinear contours.

As is seen, upper and lower elements 52 and 54 lie adjacent each to the other along inclined bi-prism interfacing surface 56. Each of lower arcuate bi-prism elements 54 includes lower surfaces 58, substantially vertically directed boundary walls 60, and corresponding inclined interfacing surface 56. Upper arcuate bi-prism element 52 correspondingly includes upper arcuate bi-prism element planar surface 62 and an upper vertical boundary wall 64. In combination, upper and lower arcuate bi-prism elements 52 and 54 form the familiar Z-contoured configuration, as was described in FIG. 3 for the linear bi-prism variable concentrator system 32.

Upper and lower arcuate bi-prism elements 52 and 54 may be formed of a solid material or combination of material compositions having discrete and differing indices of refraction, or alternatively, the surfaces forming the edge boundaries of bi-prism elements 52 and 54 may provide for changes within which discrete or combinations of liquids and/or gels may be incorporated in possible combination with solid materials. Additionally, even in the case where solid material compositions are used, varying indices of refraction may be attained throughout and individual element 52 or 54. In this manner, wide ranges of deflections of incoming rays may be attained.

As was evident for linear bi-prism variable concentrator system 32 shown in FIG. 3, where lenticulation angles 66 of upper and lower bi-prism elements 52 and 54 are substantially equal, it is seen that upper arcuate bi-prism element planar surface 62 and lower arcuate br-prism element planar surface 58 will be parallel as a function of the radial geometry when taken with respect to axis line 50.

Geometric considerations of this embodiment may provide planar surfaces for the total upper surface and lower surface of arcuate bi-prism variable concentrator system 32' and as has been seen in previous paragraphs for other embodiments, allow for ease of cleaning and reduction of any contamination when system 32' is exposed to external environmental considerations.

Although having many advantages as has previously been described, one of the disadvantages of bi-prism concentrator systems as shown in FIGS. 3 and 4 is that there may be collisions with vertical walls such as 60 and 64, as shown in the embodiment in FIG. 4 throughout the optical path of the rays being refracted and/or reflected. Thus, there may be some collision with such boundary walls either by radiation having a path at an off-angle to the plane of such boundary walls, or of radiation leaving at an off-angle. It is obvious that boundary walls as previously described, may have their contour changed or varied such that they are parallel to the light rays paths, however, this may be done where a light source exists that is parallel to the walls and known to the user. Where there is a light source with a varying angle or it is not known what direction the light source is incoming/out-going, such may have detrimental effects as to the focusing efficiency of such systems.

Referring now to FIGS. 7–10, there is shown a plurality of tri-prism variable concentrator systems 80, 80', 80", and 80''', which are useable for a plurality of purposes including the producing of parallel rays passing external to such lens systems as well as providing variable output angles for such egressing rays. Referring to FIG. 7, there is shown the basic concept of tri-prism element lens system 80 which includes first lower prism element 82, second lower prism element 84, and interfacing third prism element 86, as is shown. It is to be understood that the reference to the word "lower" associated with first and second prism elements 82 and 84 is used merely for description purposes than clarification, and does not direct itself to coordinate axes limitations.

In prior systems referred to, blocking of radiation rays may provide a minor disadvantage in the passage of such rays through various lens systems. In general, paired prisms are more generally useful for the passage of radiation rays than single prism elements, due to the fact that greater deflections may be attained. The concept of tri-prism lens system 80 as shown in FIG. 7 provides for a system which minimizes and generally obviates any blocking effects of incoming rays. For purposes of this discussion, first lower prism element 82 shall be assumed to have an index of refraction of $N^1$, second lower prism element 84 shall have an index of refraction of $N^2$, and third prism element 86 shall have an index of refraction $N^3$. In this system, incoming rays 88 may impinge third prism element upper surface 90 at a variety of angles, as is shown. However, external rays 92 pass in generally a planar manner each to the other and are normal in the plane defined by directions 20 and 24 to lower surfaces 94 and 96 of second lower prism element 84 and first prism element 82, respectively. Due to the fact that tri-prism variable systems 80 generally are able to produce parallel beams or rays 92 exiting from planar surfaces 96 and 94 throughout a variable direction of incoming rays 88, such systems 80 are highly applicable to heliostat systems.

First lower prism element 82 may include sidewall 98 in an orthogonal plane to lower planar surface 96. First lower prism inclined surface 102 interfaces and forms a boundary between first lower prism element 82 and third prism element 86, as is shown in FIG. 7.

Similarly, second lower prism element 84 includes second lower prism sidewall 100 in a plane which may be orthogonal to lower planar surface 94 and having an inclined second lower prism surface 104 which interfaces and is the boundary with and between second lower prism element 84 and third prism element 86.

Third lower prism element 86, as is clearly seen, includes an upper planar surface 90 which generally may be, but is not necessarily, planar in nature, and passes to apex line 106 with third prism element 86 interfacing contiguously with first lower prism element 82 and second lower prism element 84 along inclined surfaces 102 and 104, respectively.

Boundary walls 98 and 100 of first and second lower prism elements 82 and 84 are generally parallel to internal exiting beams 92. It is to be noted that rays 92 pass generally orthogonal in the plane formed by direction elements 20 and 24 and planes 11 thereto, to lower planar surfaces 94 and 96, and thus are not refracted in this plane upon exiting from systems 80. Since walls 98 and 100 are generally parallel to internal and exiting rays 92 with the index of refraction $N^3$, the difference between the indices of refraction of first and second lower prism elements 82 and 84, namely $N^1$ and $N^2$ increases as the total deflection angle increases. By proper manipulation of composition of materials associated with first, second and third prism elements 82, 84 and 86, external rays 92 may be generally maintained parallel to the lower planar surfaces 94 and 96.

It is to be understood that first, second and third prism elements 82, 84 and 86 may be solid compositions having substantially transparent and/or translucent type material compositions forming the same, or may include chambers within which liquids, gels, and/or solid compositions may be included to provide appropriate indices of refraction to allow passage of such rays in accordance with the concepts previously described.

Referring now to FIG. 8, there is shown triprism linear variable system 80′ which is useful for heliostat applications. A plurality of tri-prism, systems 80 as shown in FIG. 7, are mounted adjacent and contiguous each to the other in linear direction 20 and comprises first and second lower prism elements 82′, 84′ in combination with third prism element 86′.

Third prism element 86′ passes external and in interfacing relation with a series of first and second lower prism elements 82′ and 84′ as is shown, and provides an upper planar surface 90′ which intercepts and allows deflection of a plurality of incoming rays 88′ impinging on system 80′ from a source at varying angles as a function of time.

The resulting effect is a plurality of externally directed parallel rays 92′ passing in parallel relation or coincident to a plane defined by directional arrows 20 and 24. The externally directed rays 92′ pass substantially orthogonal to the lower planar surfaces of first and second lower prism elements 82′ and 84′. As was the case in previous examples, third prism element 86′ may be a solid material composition which is substantially a transparent member having a particular index of refraction $N^3$ which may have incorporated therein a particular liquid and/or gel, and/or solid mixture material composition. Similarly, lower prism elements 82′ amd 84′ may also include such liquid compositions when such prisms are in the form of a container type member.

Referring now to FIG. 9, there is shown tri-prism reflecting variable concentrator system 80″ using the concept of tri-prism systems 80 and 80′ shown in FIGS. 7 and 8. In reflecting concentrator system 80″, first and second lower prism elements 82″ and 84″ in combination with third prism element 86″ are positionally located in combination with parabolic type reflector 108 mounted substantially throughout a lower section external to tri-prism element system 80″.

Parabolic reflector 108 may have a mirror-like coating, or some like reflection mechanism to allow reflection of egressing parallel radiation rays 92″ to be reflected into reflective rays 110 which impinge at a focal point or line F.

As has been previously described, by manipulation and varying of the indices of refraction $N^1$, and $N^2$, and/or $N^3$, a plurality of optical conditions may be attained responsive to incoming rays 88″ impinging on system 80″ at varying angles. Impinging reflected rays 110 may be used at the focal point or focal line F for heating fluid, direct radiation heat concentration, or other purposes desired by the user.

The use of the basic tri-prism system 80, 80′, and 80″, as hereinbefore described, allows for a minimization of any blocking effects and provides for external passage of parallel rays in an optimized manner with respect to prior art systems.

Referring now to FIG. 10, there is shown an embodiment of a tri-prism linear variable system which is directed to a crossed-linear tri-prism variable system 80‴. In this embodiment, crossed tri-prism variable linear system 80‴ is formed of at least an upper tri-prism system 83 and a lower tri-prism system 81. However, as can be seen, lower and upper systems 81 and 83, respectively, are mounted contiguous and adjacent each to the other in a substantially orthogonal direction when taken with respect to the extension directions of lower prism elements 82‴ and 84‴ and upper prism elements 85 and 87. As can be seen, incoming rays 88‴ impinge at an angle to substantially planar surface 94‴ and are passed in a refracted mode through prism elements 89, 85 and 87 to produce substantially parallel ray egress from upper tri-prism system 83.

Rays egressing from upper system 83 may be refracted in passage through lower prism elements 86‴ and 82‴, 84‴, prior to egress from crossed tri-prism variable linear system 80‴. Emerging rays 92‴ may then be focused at focal point F.

Tri-prism systems 81 and 83 may be crossed normal each to the other, as is shown, or may be mounted in a manner to provide a predetermined angle of rotation between the extension of the prism elements. Stacking of tri-prism variable linear systems 81 and 83 may be used to provide a two-dimensional ray egress and then combined with a Fresnel type lens to provide a fixed focus point.

Referring now to FIG. 14, there is shown cubic variable deflection system 112 being a three-dimensional lens system for providing non-blocking transmissive surface concepts. In this embodiment, impinging rays 116 are angularly input to the plane defined by line segments between points 114′, 114″, 114‴, and 114⁗.

Incoming rays 116 may angularly displace themselves with respect to this plane as a function of time. As will be seen, the unique configuration of cubic system 112 allows exiting rays 118 to be transported in a substantially parallel fashion external to overall system 112. Similarly, by varying indices of refraction of components of system 112, exiting rays 118 may be formed at a particular angle to a plane defined by line segments joining the end points 120, 120', 120", and 120'".

In the specific embodiments shown in FIG. 14, rays 116 enter inverted quadrangular pyramid 114, 114', 114", 114'", and 114"", through substantially transmissive plane surface 115. The inverted quadrangular pyramid as previously defined may be formed of a transparent or translucent material which may be solid, liquid, gel, or combinations thereof dependent upon the particular function of cubic variable deflection system 112. It is to be understood that the inverted quadrangular pyramid concept as herein described may be applied to an inverter cone contour, or in the alternative, to other pyramid contours.

Subsequent to passage into the inverted quadrangular pyramid, rays then are displaced into one of four tetrahedra which share a common boundary surface with inverted quadrangular pyramid 114, 114', 114", 114'", and 114"". For the purpose of clarity, one tetrahedron such as that defined by 114'", 114"", 114, and 122, is chosen for explanation in this description.

The index of refraction of tetrahedron 114'", 114"", 114, and 122 is determined in a manner so as to direct the path of now refracted incoming rays 116 in a manner to bring the internal light paths parallel to an external face plane defined by the line segments joining the points 114'", 114"", and 122. The rays then pass to a second tetrahedron sharing a common surface with tetrahedron 114'", 114"", 114, and 122. In this explanation, the shared surface is 114'", 114, and 122.

Thus, light is redirected into an adjacent tetrahedron such as that defined by the line segments 122, 114, 114'", and 120'". The surface in common is thus seen to be 114, 122, and 114'". The index of refraction of the tetrahedron 122, 114, 114'", and 120'" is determined in a manner such that the refraction results in the light rays also travelling parallel to a plane defined by line segments joining the points 120'", 114'", 114", and 120".

Thus, rays 118 exiting deflection system 112 are in a path which is substantially parallel to the boundary planes of deflection system 112. Additionally, as is clearly seen, there is no inherent blocking of rays passing through system 112. As was the case for previous systems noted and described in previous paragraphs, cubic system 112 may be formed of differing solid materials having independent indices of refraction, or may be provided as chambers within which fluid, and/or gel may be incorporated in varying mixtures to provide a changing or programmable type of ray path direction transmission.

Referring now to FIG. 15, there is shown achromatic deflection system 124. Achromatic type lens systems are well-known in the art. Such lens systems are conventionally produced by combining lenses of differing compositions having different focal powers and differing indices of refraction so that the light emerging from the lens system forms an image which is substantially devoid of unwanted color changes. Thus, such systems in general refract light rays without dispersing such into a constituent frequency or color ranges.

Although achromatic lens systems are known, the specific embodiment shown in FIG. 15 directs itself to deflection system 124 which is formed of upper prism 126 in contiguous contact with lower prism 128. Upper prism 126 and lower prism 128 may be formed of chamber-like members in order to provide an internal volume which will allow insertion of differing liquids, or gels to permit changes in the refractive properties as a function of time.

With prisms 126 and 128, input and output surfaces are non-parallel to allow for particular refractive property changes. In reality, system 124 as shown in FIG. 15 may be considered more of a general case of bi-prism concentrator system 32 as is shown in FIGS. 3 and 4, with the walls of concentrator system 124 being formed in a particular manner to provide for the predetermined achromatic type parameter changes necessary.

Referring now to FIG. 11A, there is shown bi-prism reflecting variable deflection system 130 for providing a combination of refraction and reflection to bring incoming rays 88 to a common focal point or focal line F. Incoming rays 88 impinge and pass through upper planar surface 132 which is generally transmissive to rays 88. Where rays 88 are angularly interfacing with planar surface 132, there is an initial refraction in first chamber 134 which may be formed of a solid transmissive composition, or may be a chamber volume holding a particular liquid and/or gel composition.

Lower or second chamber or first prism 136 includes common boundary surface 138 with first prism or first chamber 134.

Lower surface of lower prism or second chamber 136 is formed of mirror coating 140 for reflection of the rays impinging thereon, or re-reflection to provide outgoing ray 142 generally directed to focus point or focus line F.

Reflecting mirror coating 140 may be an aluminum type coating to provide substantially total reflection. In this manner, incoming rays 88 initially impinge and pass through upper planar surface 132 and are initially directed to first prism or chamber 134, where they are refracted and have a path which is redirected.

The refracted rays then pass through boundary plane 138 and upon coming in contact or interfacing with lower prism 136 having a differing index of refraction than first prism 134, such rays are once again refracted.

The rays then impinge on reflecting mirror coating surface 140 and are reflected and pass through boundary plane 138 into first chamber or prism 134 prior to emergence from system 130 as outgoing rays 142.

Referring now to FIG. 11B, there is shown a still further embodiment for the system 130 developed and described in FIG. 11A. Bi-prism reflecting variable concentrator system 130' is similar in geometry to that for system 130, with the exception that boundary plane 138' interfacing between upper prism 134' and lower prism 136' extends from apex point 139 and intersects an opposing wall of interfacing upper and lower prisms 134' and 136'. As previously described, lower surface 140' may be mirror coated to provide reflection capabilities for incoming ray 88 for emergence of outgoing ray 142 to focus line or point F. As is evident for both embodiments shown in FIGS. 11A, 11B, overall systems 130 and 130' may be formed of a singular set of elements or a plurality of elements mounted adjacent each to the other.

This type of reflective element is useful in that such provides a differing relationship between incoming ray deflection angles and the magnitude of net refraction when taken with respect to other forms of bi-prism elements, as shown in FIGS. 1–4. In particular, the embodiments shown in FIGS. 11A, 11B allow focusing devices to be constructed with less chromatic anomalies than those found in previous concepts. It is noted that what is herein provided is an inclined reflector where the reflector surfaces 140 or 140' are inclined with respect to upper planar surfaces 132 or 132' upon which incoming rays 88 impinge and pass therethrough.

By differing and varying the indices of refraction in first prisms 134, 134' and second prisms 136, 136', as a function of time, it is relatively simple to allow light rays to be displaced in either a clockwise or counter-clockwise direction, or in other words, to permit path direction compensation as a function of the particular use involved.

Referring now to FIGS. 12 and 13, there is shown further embodiments of the overall tri-prism variable deflection systems 144 and 144'. In FIG. 12, there is seen a pair of upper prisms 146 and 148 having a common upper planar surface 150 through which incoming rays are transmitted. Upper prism surfaces 146 and 148 have a common boundary plane 152 through which light may be transmitted.

Upper prisms 146 and 148 have unique and individual indices of refraction responsive to particular deflection necessitations of a predetermined use. It is to be understood that where upper prisms 146 and 148 have a common or identical index of refraction, then boundary plane 152 does not in reality exist and tri-prism reflecting variable deflection system 144 becomes another type of tri-prism reflecting element wherein upper prisms 146 and 148 are a common transmitting prism. Lower prisms 154 and 156 have common boundary planes 158 and 160 with respective upper prisms 146 and 148. Lower reflecting surfaces 162 and 164 form the reflecting surfaces for respective lower prisms 154 and 156. In this manner, incoming rays pass through upper planar surface 150 and if inclined thereto, are refracted and pass through respective upper prisms 146 and 148 to impinge and pass through boundary planes 158 and 160.

Due to the differing index between lower prisms 154, 158 and upper prisms 146, 148, the rays are once again refracted and impinge on lower surfaces 162 and 164 which are mirror coated in any one of a number of ways well-known in the art. The rays are then reflected from lower reflecting surfaces 162 and 164 and are passed back through prisms 154, 146, and 156, 148 to emerge as a frontal type prism system to provide a particular deflection depending on the particular contouring geometry of system 144.

Referring now to FIG. 13, there is shown another variant or embodiment of tri-prism reflecting variable deflecting system 144'. In this embodiment, common lower prism 166 is in interfacing contact with upper prism elements 168 and 170 throughout interfacing transmissive boundary planes 172 and 174. Upper prisms 168 and 170 interface at boundary plane 176 and common lower prism 166 includes reflecting lower surfaces 178 and 180, as is shown.

In this embodiment, upper prisms 168 and 170 may have differing indices of refraction and lower common prism 166 further includes an individual index of refraction.

However, it is clearly seen that still another variant of FIG. 13 may include common indices of refraction between upper prisms 168 and 170 to merely provide a differing type of refraction deflection of incoming rays.

Thus, FIGS. 12 and 13 may represent four variants of tri-prism deflection systems 144 and 144', as has previously been described.

Additionally, prisms 144 and 144' which define differing prisms may also, as has been previously described for other systems, include chamber members wherein different liquids or gels having individualistic indices of refractions may be incorporated therein to provide particular deflection ray paths as a function of the user needs.

It has been made clear that any of the deflection systems including embodiments thereof such as deflection systems 10, 32, 80, 112, and 144, as previously described, may be formed of differing solid materials as well as various liquids and gels. Where chambers are to be formed and the outer walls of the aforementioned systems are formed of glass, such allows for a particular etching which permits a continuous graded index from the ambient atmosphere to the glass.

Thus, such a graded index may be performed between any material composition in contact with the glass surface and the surface itself. Such graded index techniques now known in the art will minimize losses due to any phase change reflections at the interface between the composition and the glass surface.

In this manner, gases as well as fluids, gels, solid materials and mixtures thereof may be used for the chambers forming portions of the aforementioned systems. Additionally, a series of compositions which change phase from gases to liquids may be used, such as butane, or freon, which may be reversibly varied between gaseous phase and liquid phase through temperature/pressure modifications. It is understood that with the use of such phase change materials, large index of refraction variations may be obtained by merely changing the pressure and/or temperature of the system.

Referring now to FIGS. 16A, B and C, there is shown a plurality of fluid lens systems 182, 192, and 194, shown for clarity purposes in schematic form to provide the pumping of ions through semi-permeable members from either one chamber to another, or from one lens system to another.

Referring to FIG. 16A, there is shown optical deflection system 182 having first chamber 184 adjacent second chamber 186 and having interface optical membrane 188 which may be at least partially osmotic.

Ions are pumped in a reversible manner through optical osmotic membrane interface plane 188 in the reversible direction shown by directional arrow 190. Thus, this provides for a manner and mode where ions may be either inserted or removed from either chambers 184 and/or 186 to vary the particular index of refraction responsive to user needs. Where external fields are used, this type of interaction between chambers 184 and 186 allows for a simplification of the fabrication of system 182 since external fields may be applied to drive ions in a particular direction into one chamber or another, as necessitated by the particular objective of the user.

Referring now to FIG. 16B, there is shown non-optical osmotic concentrator system 192 which schematically describes passage and transport of ions from one chamber 198 to a second chamber 196 in a reversible manner as shown by directional arrow 200 across non-optical membrane 202. Referring to FIG. 16C, there is shown fluid ion source and/or sink concentrator system 194 which includes ion source and/or sink 204 having contained therein optical system 206. Ions may be reversibly transported from source and/or sink 204 to system 206 to provide necessary ray deflections. Obviously, ions may be transported through the side-walls of system 206 in a reversible manner from an external source and/or sink displaced from system 206.

In overall concept, systems as previously described may be used in a combined method or overall system to provide both solar tracking functions, as well as focusing systems. As is seen in FIG. 17, a plurality of incoming rays 208 may impinge on upper surface 210 of heliostat or solar tracking system 212 to provide a plurality of parallel rays 214.

Any one of a number of the previously described concentrator systems may be used for providing parallel rays 214 within first heliostat system 216. Rays 214 are then refracted in secondary focusing system 218 and become refracted rays 220 prior to emergence from lower surface 222.

Rays 220 are then refracted into focusing rays 224 and impinge either on focus line or focus point F. Thus, as is seen, the overall deflection systems as previously derived, may be serially stacked adjacent each to the other and allows the rays to pass in series to a surface which compensates for the motion of the sun or other source and then through a secondary system for focusing the refracted rays to a focus point or line F.

By varying indices of refraction as has been previously shown, focal lengths may be varied or other optical properties controlled. With the use of such serially stacked systems as schematically shown in FIG. 17, the control of various parameters are provided in a simple manner since the displacement of the sun or other source as a function of time does not have to be taken into account with respect to focusing. Through use of systems such as that shown in FIG. 17, focusing functions of various systems is simplified in that the focusing is made independent of the tracking of the source as a function of time.

Figure 18:
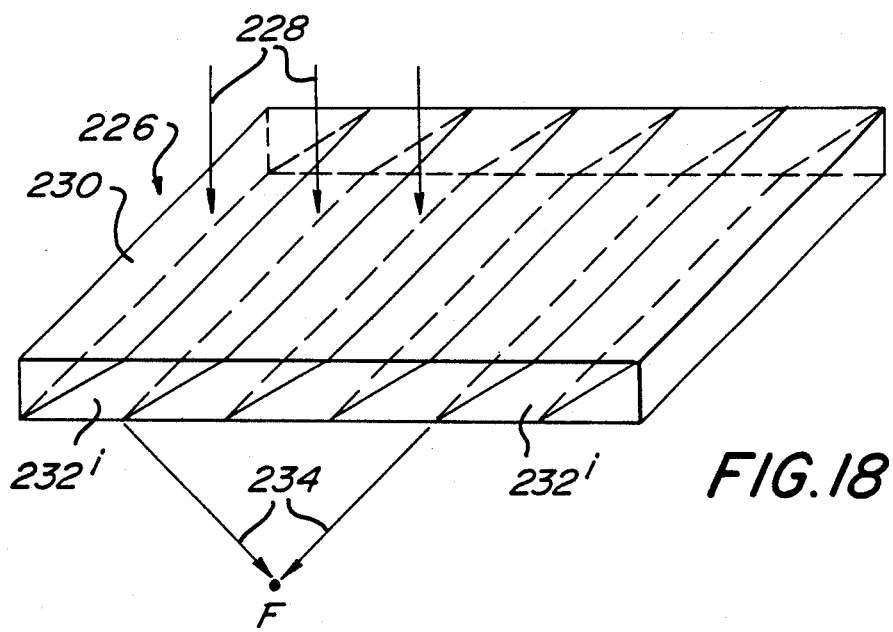
FIG. 18 is a perspective view of an embodiment of the lens deflection system showing a series of consecutively spaced prisms defining a stratified variable concentrator system.

Referring now to FIG. 18, there is shown a particular form of variable concentrator system hereinbefore described, which is termed stratified variable concentrator system 226. Concentrator 226 is particularly directed to variations of bi-prism variable deflection system 32 which allows for extremely fine control of small deflections and provides a system which is easily fabricated.

System 226 is formed of a series of consecutively spaced prisms $232^i$, where the letter i directs itself to the particular prism. In this particular type of system, a constant ratio between successive indices is provided as follows:

$$\frac{N_{232^i}}{N_{232^i}+1} = \frac{N_{232^i}+1}{N_{232^i}+2}$$

where: $N_{232^i}$ = index of refraction of $i^{th}$ prism

Thus, each of elements $232^i$ is dependent on a next successive and a next previous element $232^i+1$, $232^i-1$. This is necessitated to allow incoming rays 228 to have the same overall deflection.

Figure 19:
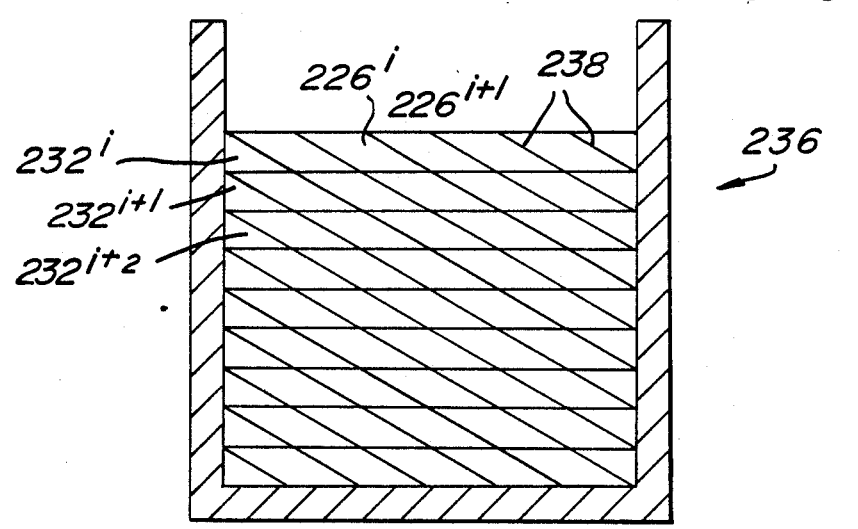
FIG. 19 is a cross-sectional view of a plurality of layers of the stratified lens deflection system shown in FIG. 18.

The method of fabrication of series of stratified variable concentrator systems 226 as shown in FIG. 18 is seen in the cross-section FIG. 19 which shows mold 236 which may be shaped in any desired form directed to a particular use. Mold 236 may be optically shaped, or may even be rotated to allow for different strata for providing different angles of lenses within particular lenses of prisms $232^i$. Maintaining the index of refraction ratios as is shown in FIG. 4 is a problem which may be alleviated through utilization of mold 236. Thus, the index of refraction of prisms $232^i$ may be reset or changed over a particular length. Thus, concentrator system 226 becomes a layered type of concentrator system 226. Different layers may be poured or otherwise inserted within mold 236 and allowed to solidify. The layers $232^i$ may then be cut at a predetermined angle along the severing lines 238, as is shown in FIG. 19. The severing lines 238 may be at any particular angle dependent upon the particular use and objective for stratified variable concentrator system 226 or any of its embodiments. Layers may be formed at differing angles, each with respect to the other, where such layers are poured into mold 236 and solidified and the mold is rotated for a next successive pouring.

Graded indices of refraction may be provided in that successive layers $232^i$ may be allowed to dissolve one into the other, or alternatively, sprays of varying mixture indices of refraction may be inserted.

In still another method of grading the indices of refraction, a particular composition material is poured into mold 236 and then another composition is poured in which dissolves the initial composition in a predetermined amount. Such compositions may be chosen so that the initial composition dissolves as the two compositions mix, but the degree of mixing is controlled by the particular nature of the dissolution so that there is a graded index of refraction formed. Where graded indices of refraction are provided, there is removed phase change reflections that occur when stratified types of systems are used.

An extremely important consideration and advantage of the variable concentrator systems as herein described has been that a wide variety of optical properties may be exhibited by the variable index concentrator systems having a wide disparity of physical contours. One of the most useful overall contours occurs when the outer boundary surfaces of the lenses in question are parallel planes. As has been stated, such parallel planes allow for ease of manufacturing, allows for ease of cleaning such lenses when the lenses are placed in the ambient atmosphere, provides for compact lens systems, and may be supported in a rigid and stable manner in a very precise positional location by inexpensive float glass. However, the planar parallel boundaries of lens concentrator system also allows for another very useful property, in that particular lens systems may be stacked in a manner to provide a large variety of optical configurations and produce a concatenation of refractions which provide for extreme optical focusing and the minimization of blocking effects to electromagnetic rays passing therethrough.

Figure 20:
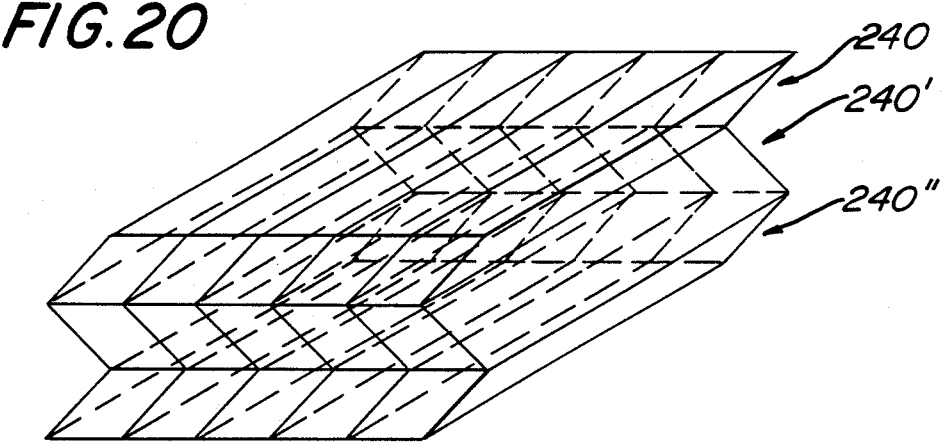
FIG. 20 is a perspective view of an embodiment of the lens deflection system showing stacked single prism lens members.
Figure 21:
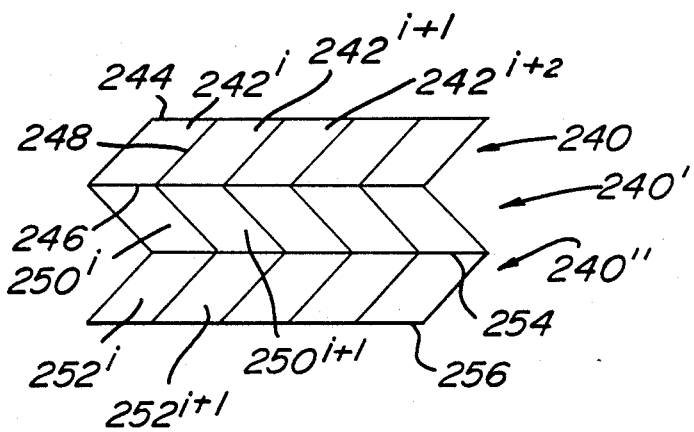
FIG. 21 is an end view of the embodiment of the lens deflection system as shown in FIG. 20.

FIGS. 20-25 direct themselves to various lens systems to be described in following paragraphs which show stacking of concentrator lens systems for increasing and optimizing the deflective power when taken with respect to a single lens system. Referring now to FIGS. 20 and 21, there is shown single lens concentrator systems 240, 240' and 240'' stacked one upon the other in vertical direction 24. Upper single prism lens 240 includes a plurality of prisms $242^i$, each having a predetermined index of refraction responsive to particular needs of the user. Upper surface 244 of prism 240 is planar in contour and substantially parallel to lower surface 246 with individual lens prisms $242^i$ being bounded by boundary walls 248. As has been stated previously, lens prisms $242^i$ may be solid configuration compositions formed of materials which are substantially transparent and/or translucent having a particular index of refraction or in the alternative, may be formed of compartments wherein particular gases, liquids, and/or gels may be inserted.

Second single prism concentrator lens system 240' is sandwiched between upper and lower lens systems 240 and 240". Second prism concentrator system 240' includes a plurality of prisms 250$^i$ which correspond in their index of refraction to prisms 242$^i$ and share the common lower planar surface 246 with lens system 240. Lower lens prisms 252$^i$ are contiguous with and interface to prisms 250$^i$ along the common lower and upper planar surfaces 254 when taken with respect to lens systems 240' and 240", respectively. In effect, where prisms 242$^i$, 250$^i$, and 252$^i$, all have the same index of refraction, for optical considerations, planar surfaces 246 and 254 may be removed from any optical considerations. Thus, as can be seen, the embodiment shown in FIGS. 20 and 21 essentially triple the reflective power of a single lens system utilizing this concept. As can be seen, this is a mirror type imaging stacking process which provides for distinct advantages over prior systems and allows for an overall upper surface 244 and a lower planar surface 256 for ease of mounting and fabrication. It is to be understood that what has been described is for illustrative purposes only and a plurality of stacking lens systems 240 may be provided above or below the three stacking layers, as has been described in FIGS. 20 and 21.

Figure 22:
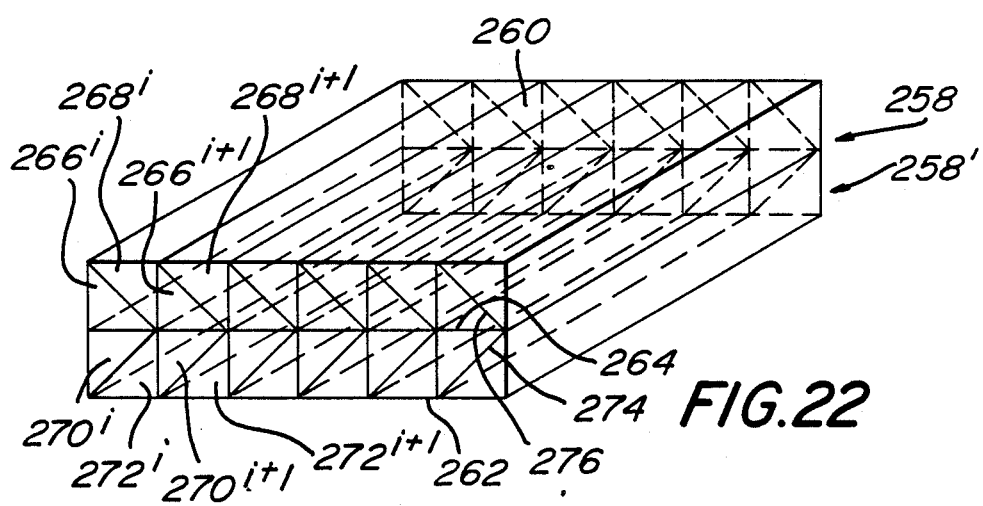
FIG. 22 is a perspective view of stacked first and second bi-prism layers.

Referring now to FIG. 22, there is shown stacked first and second bi-prism concentrator systems 258 and 258' analogous to bi-prism variable concentrator system 32 shown in FIG. 3. However, as can be seen, lens systems 258 and 258' are stacked in the vertical direction 24 to provide upper planar surface 260 and overall lower planar surface 262 with interface surface 264 located therebetween. Upper bi-prism concentrator system 258 is formed of pairs of prisms 266$^i$ and 268$^i$ interfaced with inclined surface 276. Lower stacked bi-prism concentrator system 258' includes lower prisms 270$^i$ and 272$^i$ interfaced through lower inclined surface 274.

Mirror stacking occurs when the index of refraction of upper prisms 266$^i$ are equal to lower prism indices of refraction 270$^i$. Additionally, it is clear that interface surface 264 between prism elements 258 and 258' may be removed to provide a continuous index of refraction in vertical direction 24. In this manner, deflective power or the ability to focus particular incoming rays to a predetermined focus point or line may be increased through continuous stacking of elements 258 and 258', dependent upon the use and objective of the overall system.

Figure 23:
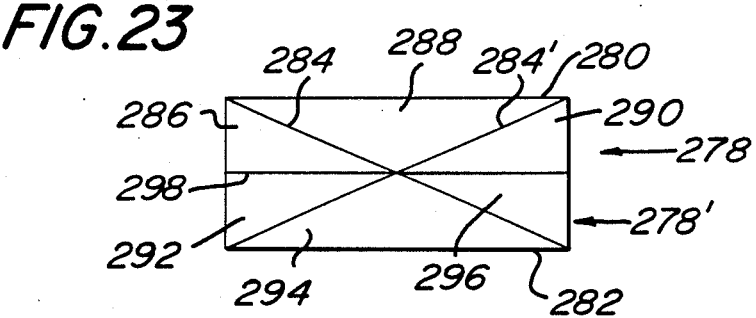
FIG. 23 is an elevational view of stacked tri-prism lens deflection system.
Figure 24:
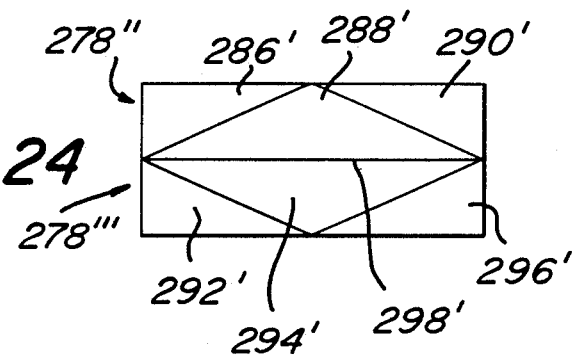
FIG. 24 is an elevational view of an embodiment of a tri-prism lens deflection system.

Referring now to FIGS. 23 and 24, there are shown stacked versions or embodiments of tri-prism variable concentrator systems 80, and 80'. As shown in FIG. 23, upper and lower tri-prism systems 278 and 278' are provided in stacked relation having overall upper and lower planar surfaces 280 and 282. Upper tri-prism lens system 278 includes interface boundaries 284 and 284' which delineate upper prisms 286, 288 and 290. Each of upper prisms 286, 288, and 290 have a predetermined index of refraction which is in a mirror type stacking concept equal to respective lower indices of refraction for prisms 292, 294 and 296. Interface between upper and lower prism systems 278 and 278' is provided by planar interface surface 298. Where upper and lower prisms 286, 292 and 290, 296 have equal indices of refraction, such is termed a mirror stacking type overall system and provides for increased deflection control of incoming rays to upper surface 280 for emergence on lower surface 282. Additionally, as has been the case in previously described systems, any of prisms 286, 288, 290, as well as any of prisms 292, 294 and 296 may be solid, formed in a container-like mechanism for incorporation therein of a gel, liquid, gas system, or mixtures thereof.

In the embodiment shown in FIG. 24, still another type of tri-prism stacking element system is shown, where central prisms 288' and 294' interface each with respect to the other along interface surface 298'. Once again, as in the embodiment shown in FIG. 23, interface line 298' may be removed and a continuous system provided between upper and lower central prism elements 288' and 294'. In a mirror type stacking system, prism elements 286' and 292', as well as 290' and 296' incorporate compositions therein which have substantially equal indices of refraction.

Figure 25:
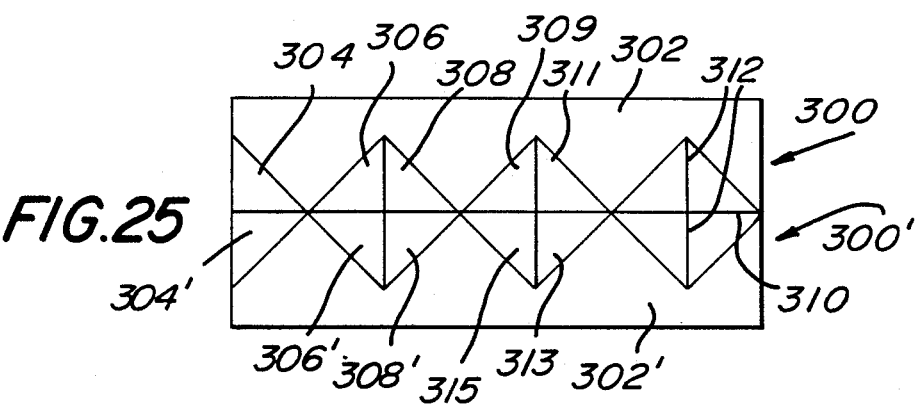
FIG. 25 is an elevational view of a further embodiment of a tri-prism lens deflection system.

Referring to FIG. 25, there is shown stacked tri-prism lens systems 300 and 300' which are analogous to the tri-prism system shown in FIG. 10 and which is a horizontally stacked prism shown in FIG. 23. As can be seen, upper lens 302 interfaces with prisms 304, 306, 308. Additionally, lower lens 302' interfaces with lower prisms 304', 306', 308' in consecutive order. Stacked systems 300 and 300' interface along planar surface 310 and provides ease of stacking for systems 300 and 300'. Upper and lower prisms 306, 308 and 306', 308' throughout the transverse extension are separated by non-refracting walls 312.

The indices of refraction of the boundaries may be controlled in a predetermined manner so that at each prism element as previously described, the light from a given angle may be refracted to a path substantially parallel to non-refracting walls 312. This type of control is provided in upper tri-prism system 300 and as the electromagnetic rays are collimated, such may be termed as a collimated heliostat type light path which passes to lower lens system 300' where at each prism 304', 306', and 308', the electromagnetic radiation ray may then be refracted to a predetermined direction path with substantially no blocking losses.

One of the very important advantages of the layering system as described and detailed for FIGS. 20–25 allows for a predetermined linear motion to be achieved between the planes or layers of the systems. Thus, one layer may be displaced between two other layers, or in the alternative, a rotational type motion may be achieved. Such a rotation may be used for azimuthal tracking and the changes in the indices of refraction of this particular prism element may provide for the attitude tracking to achieve in combination a two-dimensional tracking system.

Motion between various layers may be simplified through the use of a lubricating fluid which has a similar index of refraction to the layers being displaced with respect to each other. Various films and coatings may be used to change the phase change reflection qualities, the polarization, the color and other optical and non-optical properties of such systems.

Reflective coatings such as those placed on surfaces of mirrors provide for additional useful properties to the systems herein described. A mirror coating which is frequency specific may act as a focusing element and transmitted frequencies may be inversely deflected or such deflections may be used in combination with additional elements to provide different foci for various electromagnetic rays being transmitted through the mirrors at different frequencies. In this manner, multiple reflecting layers may provide different foci for each frequency bandwidth and specifically, each frequency bandwidth may have either unitary or multiple foci on opposing sides of the reflection concentration systems.

Changing the indices of refraction as a function of coordinate axes and/or time may be provided in a number of manners and modes, some of which have been previously described for the systems of this invention. Where the substances of the particular prisms are maintained within a fixed boundary of the prism, electro and acoustic optics may be used for changing the particular indices of refraction as a function of time. Additionally, where gases and liquids, as well as gels are used within fixed boundaries, changes and variations in pressure and temperature may be provided to also change the indices of refraction. Further, variable gas ionization for the substances contained within the prism boundaries may be provided to vary the indices of refraction over wide ranges.

Multiple type substance elements within prism elements may be used and generally results from inputting or egressing different materials within the overall prism boundary. Continuous ranges of indices of refraction may be produced through various mixtures of ionized gases, gases, vapors, liquids, gels, and solids. Chemical reactions between the substances may result in different compositions having varying indices of refraction. One typical approach used for illustration purposes is to transport ions from one prism chamber to another through the ends of extended prisms, or across the boundaries of adjacent prisms which may be achieved by osmotic membranes through the optical and/or non-optical wall boundaries, as has previously been described.

Figure 26:
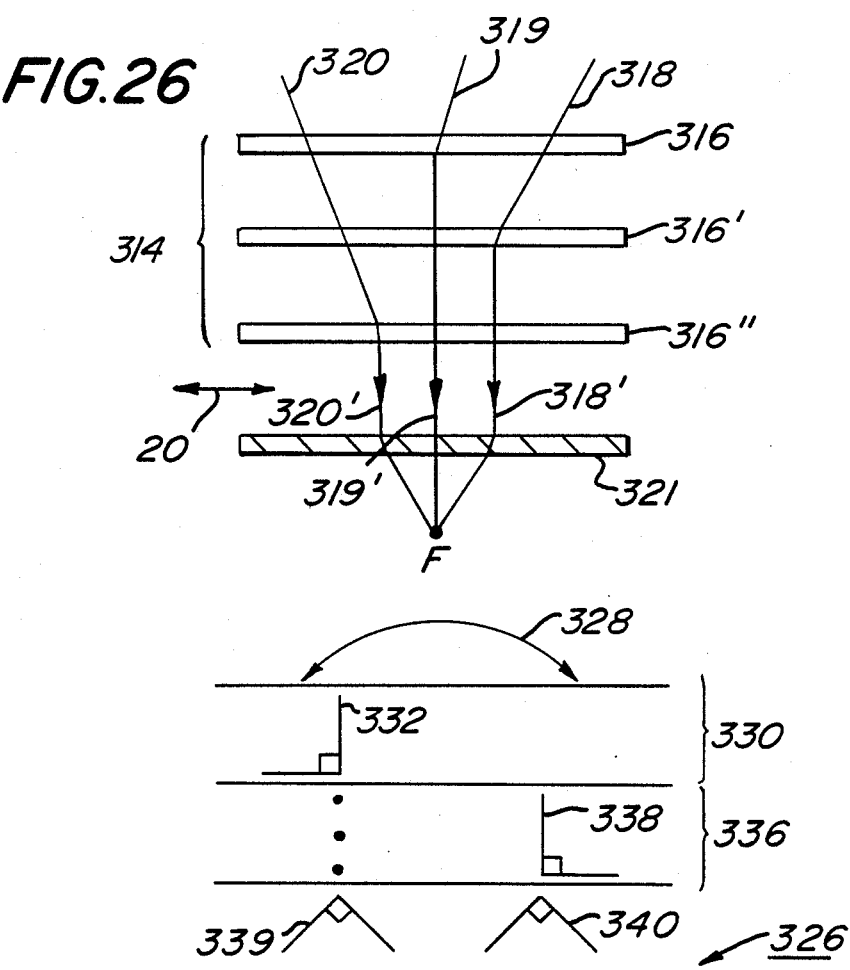
FIG. 26 is a schematic representation of a heliostat lens deflection system showing a plurality of deflecting layers.

Referring not to FIG. 26, there is shown variable index of refraction analog system 314 comprising a plurality of holographic layers 316, 316', and 316". It is to be understood that the three layers 316, 316' and 316" are used for illustrative purposes only and as will be seen in the following paragraphs, the exact number of layers is determined by particular uses and objectives in various applications.

The general overall purpose of holographic analog system 314 is to take incoming rays 320, 319 and 318 which are impinging on first layer 316 at varying incidence angles, and to transform such into generally parallel rays 318', 319', and 320'.

The generally parallel rays 318', 319' and 320' may be passed through a standard type lens 321 used for focusing the rays to focal point or line F, as shown. It is to be understood that standard type lens element 321 is not part of the inventive concept as herein described, however, such is shown schematically for the purpose of clarifying one possible use of analog system 314.

The purposes and objectives of variable index of refraction analog holographic system 314 is to provide tracking of rays incoming to system 314 throughout a variety of angles with the angles of particular rays being determined as a function of time. Each of layers 316, 316' and 316" is angle specific and as in the usual case of holographs, diffraction will occur at one angle input range for a particular layer and the emerging ray will pass through the other holographic layers in a manner such that they are transparent to such rays.

In the schematic representation shown in FIG. 26, incoming rays 319 impinge on holographic layer 316 which is angle specific to the angle of rays 319. The radiation rays 319 are then diffracted within layer 316 and emerge as output rays 319'. Output rays 319' then pass through the remaining holographic layers 316' and 316" to enter lens system 321 which then focus such rays at focus F.

Rays 320 are seen to pass through layer 16 as if it were a transparency, and impinge on angle specific holographic layer 316". Rays 320 as can be seen, are then diffracted within holographic layer 316" and emerge as output rays 320', substantially parallel to rays 319'. Rays 320' then pass through lens system 321 and are focused at focus point F. Similarly, ray 318 is seen to pass through both layers 316 and 316" and are diffracted within layer 316' to emerge as ray 318'.

Each layer 316, 316' and 316" is formed in a manner to be angle specific and only cause deflection of rays within a small angle bandwidth. Thus, by using such holographic technique systems, a solar source for example may be displaced across the sky essentially tracked throughout its path by a fixed concentrator type system.

The specific holographic optical elements may be formed through the illumination of photographic plates or film with a plurality of coherent point sources. Modulation of the plate or film index of refraction may be recorded through volume of the film and diffraction of light may be controlled in longitudinal direction 20. The control of the index of refraction of the holographic elements or layers 316, 316', and 316" in direction 20 thus provides the user with a complete analog system associated with either the mono-prism variable index concentrator system 10, bi-prism variable index concentrator system 32, tri-prism variable concentrator system 80, as well as cubic type variable deflection system 112 and associated embodiments thereof.

Each layer 316, 316' and 316" of the specific example shown in FIG. 26 is input angle range specific and deflects light rays 318, 319 and 320 into substantially the same direction for heliostating purpose. Each input angle range would thus require a unique and specific layer 316, 316' and 316". Differing angles within the input angle range produces specific output deflections and thus the smaller the input range of each layer, the more precise the tracking of rays 320, 319 and 318, as they pass in differing directions as a function of time.

It is to be understood that any area of layers 316, 316' and 316" in the plane defined by directional arrows 20 and 22 is substantially the same as all other areas, and thus, a small master may be made of layers 316, 316' and 316", and replication allows for a large increase in the sizes.

Tracking of input rays 318, 319 and 320 throughout the ambient atmosphere may be provided within specific angle ranges. Where 1.0 degrees angle ranges are to be used for tracking, a holographic analog of two crossed linear variable concentrator lens systems 10 may be used to provide a time-variable heliostat. Each analog mono-prism system 10 would thus comprise 180.0 layers 316 . . . 316" which act as linear prisms and with all layers being aligned in a first direction.

The second set of holographic analog layers 316 . . . 316" would be aligned in a second direction perpendicular to the first direction and would also comprise 180.0 layers associated with each 1.0 degree angle range.

Due to the fact that layers 316 . . . 316" are angle specific, they are contrarily wavelength non-specific.

Such analog systems 314 may be made reflective or transmissive, as needed for a particular purpose and objective. A mirror element formed behind a transmissive heliostat of the holographic analog type thus would perform as a displacing mirror heliostat. On the other hand, a reflecting heliostat may be used for central receiver applications when the angle range is limited to a small value.

Figure 27:
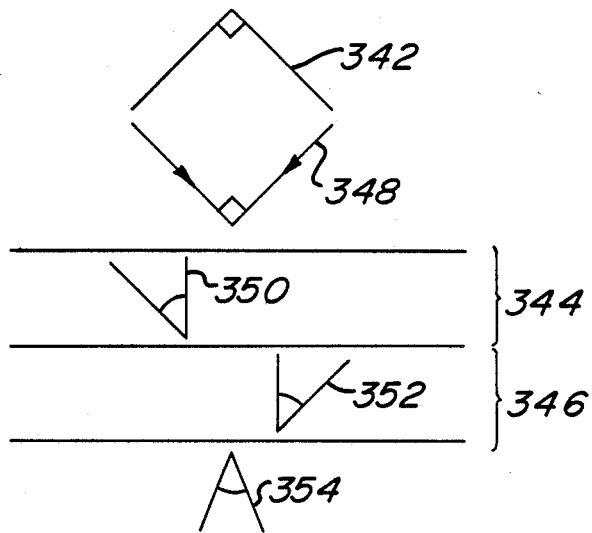
FIG. 27 is a schematic representation of a holographic lens deflection system; and, FIG. 28 is a schematic representation of an embodiment of the holographic lens deflection system shown in FIG. 27.

Referring now to FIG. 27, there is shown a schematic diagram of a one-dimensional heliostat holographic analog system 326. System 326 accepts electromagnetic radiation rays over a 180° range 328. Initial holographic layer 330 intercepts rays within quadrant 332 and deflects such in a rotational mode as depicted by output quadrant 334. Second holographic layer 336 intercepts rays within quadrant 338 and is constructed in a manner to produce a rotational quadrant 340. Thus, ray intercept within quadrant 338 is rotated into the 90° half space defined by quadrant 340.

However, quadrant 334 and quadrant 340 are coincident and output 342 results from layers 330 and 336. The next two holographic layers 344 and 346 intercept the input ray angle 348. Layer 344 accepts only a 45° half space and rotates ray quadrant 348 into quarterspace 350. Similarly, layer 346 rotates through a half space to provide half quadrant 352. This results in output space 354.

The process of halving the input angle from one set of layers to a next set of layers may be continued, wherein every two layers as represented by 330, 336, or 344, 346, reduce the angle variation by a factor of two. Eight sets of two layers resulting in a total of sixteen layers produces heliostat analog system 326 which has a resolution approximating 0.7°.

FIG. 27 directs itself to a one-dimensional heliostat using a mono-prism holographic analog set of layers. A two-dimensional system may be provided by crossing two of the mono-prism holographic analog systems which would yield 32.0 layers.

A binary prism type holographic system has been shown for illustrative purposes only. Each input space may be divided into a predetermined number of subspaces and projected into the same or other output space angle ranges.

It is to be further understood that in any holographic analog system which is transmissive to produce a transmissive heliostat, a lens or other optical element may be used to focus radiation rays from small ranges of angles to either a line or point focus F.

Referring now to FIG. 28, there is shown a schematic diagram of a binary heliostat holographic analog system 360. As in the analog system shown in FIG. 27, system 360 accepts electromagnetic radiation rays over a 180° range 328. Initial holographic layer 364 intercepts rays within quadrant 362 and such passes through initial layer 364 in an undeflected manner as is shown by half space ray diagram 366. Half space ray 368 is deflected within layer 364 to have the same path as 362 within layer 364.

The resulting ray path from layer 364 results in ray path 372 prior to entrance into second layer 374. Through use of this type of binary heliostat analog system, it is seen that by the use of one layer 364, the ray angle has been halved. Interception by layer 374 causes a further halving as depicted by the transformation of ray paths 376 into rays 378, as well as ray 380 into ray 382 resulting in rays 384 egressing from second layer 374.

By use of this technique, the number of layers needed to achieve a particular resolution is halved when taken with respect to the overall concept shown in the schematic FIG. 27. Thus, sixteen layers are needed to produce a two-dimensional heliostat with a resolution of 0.7°. In practice, some of the aforementioned layers may be composed of a multiplicity of holographic analog layers with each layer having a discrete bandwidth.

Assuming there is provided a variable index concentrating system much in the manner as previouly described, such lens may be severed in order to provide a thin strip covering a half-width of the lens. Holograms may then be taken of adjacent segments of the lens and a hologram may be reassembled of the half-width lens. Such a process may be replicated a multiple number of times to reconstruct the entire lens system. The reconstruction may then be the master for producing large holographic lenses. As previously described for other variable concentrating lens systems, two holographic analog systems may then be crossed to form a point focusing lens.

Many advantages arise from the use of such holographic lens systems and processes which include independent layers being formed where the layer order is unimportant to the overall system. It is to be further noted that manufacturing methods are simplified, in that different layers are made and then replicated separately in some cases. Further, each of the members of each pair may be the mirror image of the other and thus, only one master would be needed for a pair of crossed lenses. These advantages greatly simplify the formation and manufacturing costs of such holographic lens systems.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A lens deflection system for deflecting radiation emitted from a source comprising:
   (a) first radiation transmissive means for transmissively directing said radiation; and,
   (b) second radiation transmissive means for transmissively directing said radiation, said lens deflection system being adapted to provide a varying index of refraction for said radiation passing internal said first and second radiation transmissive means, at least one of said first and second radiation transmissive means including a pair of at least partially transmissive prism members, each of said prism members being arcuately directed about an axis passing through a plane common to said prism members and each having a different index of refraction.

2. A method of differentially deflecting radiation from a source comprising the steps of placing a lenticulated light transmissive means in the path of said radiation, said lenticulated light transmissive means defining a plurality of adjacent, partially transmissive prism members distributed orthogonally to the direction of said radiation so that different parts of said radiation passes through different ones of said prism members, each of said prism members being arcuately directed, and selecting indices of refraction for said prism members which are different from each other.

3. A lens deflection system for deflecting radiation emitted from a source comprising:
   (a) first radiation transmissive means for transmissively directing said radiation; and,
   (b) second radiation transmissive means for transmissively directing said radiation, said lens deflection system being adapted to provide a varying index of refraction for said radiation passing internal said first and second radiation transmissive means, at least one of said first and second radiation transmissive means including a pair of at least partially transmissive prism members, at least one of said first and second transmissive means being formed into a closed contour defining at least one chamber therein partially filled with a predetermined material composition, and at least one osmotic membrane member for allowing transport of at least a portion of said predetermined material composition there through.

4. A lens deflection system for deflecting radiation emitted from a source comprising:
   (a) at least a first means in the form of a first holographic diffractive layer member diffracting said radiation impinging on an extended area of said first layer member at a first predetermined angle to a predetermined output angle and transmitting without diffraction said radiation impinging on said extended area at a second predetermined angle;
   (b) at least a second means in the form of a second holographic diffractive layer member diffracting said radiation transmitted through said first means without diffraction and impinging on an extended area of said second layer member at said second predetermined angle to said predetermined output angle and transmitting without diffraction said radiation diffracted to said predetermined output angle by said first means;
   (c) said first and second diffraction layer members positioned so that the same radiation passes through both of said layer members.

5. The lens deflection system as recited in claim 4 where said radiation rays passing external said diffractive layer members are substantially parallel each to the other.

6. The lens deflection system as recited in claim 5 including a focusing member for focusing said emitted radiation rays to a focus.

7. The lens deflection system as recited in claim 4 where said source faces a radiation input surface of said lens deflection system.

8. The lens deflection system as recited in claim 4 where said source faces a radiation output surface of said lens deflection system.

9. A lens deflection system as recited in claim 4, wherein said first means transmits radiation impinging on said extended area of said first layer outside of those approximating said first predetermined angle without diffraction and wherein said second means transmits radiation impinging on said extended area of second layer at angles outside of those approximating said second predetermined angle without diffraction.

10. A lens deflection system for deflecting radiation emitted from a source comprising:
   (a) at least a first radiation transmission means in the form of a holographic diffraction layer deflecting input radiation rays having a first input angular range to a first predetermined radiation ray output angular range and transmitting input radiation having a second input angular range without deflection, said first input angular range and said first output angular range extending over equal angles; and
   (b) at least a second radiation transmission means in the form of a holographic diffraction layer deflecting input radiation rays having said second input angular range to a second predetermined radiation ray output angular angle and transmitting without deflection input radiation having said first input angular range, said second input angular range and said second output angular range extending over equal angles;
   (c) said first and second transmission means being positioned so that the same radiation passes through both of said first and second holographic diffraction layers.

11. The lens deflection system as recited in claim 10 where said first and second predetermined radiation output angular range is substantially equal.

12. A lens deflection system for deflecting radiation emitted from a source including radiation transmissive means for deflecting said radiation, said radiation having an output angular range less than an input angular range impinging on said radiation transmissive means where said output angular range is substantially equal to a reciprocal value of an index of refraction of said radiation transmissive means.

13. The lens deflection system as recited in claim 12 where said index of refraction of said radiation transmissive means is substantially equal to 2.0.

14. The lens deflection system as recited in claims 12 or 13 where said radiation transmissive means includes at least one radiation transmissive member.

15. The lens deflection system as recited in claims 12 or 13 where said radiation transmissive means includes a multiplicity of radiation transmissive members.

16. A heliostat system for focusing radiation from a displaceable source independent of time, including:
   (a) fixed radiation deflection means comprising a plurality of adjacent prisms with varying indices of refraction for deflecting radiation from different directions and impinging on a frontal face of said radiation deflection means into parallel rays exiting from a rear face of said radiation deflection means, and,
   (b) a focusing layer member, said parallel rays impinging on said focusing layer members subsequent to passage of said radiation from said rear face of said radiation deflection means, said focusing layer member focusing said rays toward a focal point.

17. The heliostat system as recited in claim 16 where said radiation deflection means is substantially contiguous with said focusing layer member.

18. The heliostat system as recited in claim 16 where said radiation deflection means includes an index of refraction which has a predetermined varying value with respect to time.

19. The heliostat system as recited in claim 18 where said radiation deflection means includes:
   (a) at least a first radiation transmissive means for transmissively directing said radiation, said first radiation transmissive means having a pair of rear surfaces;

(b) at least a second radiation transmissive means for transmissively directing said radiation, said radiation passing from one of said first radiation transmissive means rear surfaces to said second radiation transmissive means; and, (c) at least a third radiation transmissive means for transmissively directing said radiation, said radiation passing from the other of said first radiation transmissive means rear surfaces to said third radiation transmissive means.

20. The heliostat system as recited in claim 18 where said radiation deflection means includes:

(a) first radiation transmissive means for transmissively directing said radiation; and, (b) second radiation transmissive means for transmissively directing said radiation, said heliostat system being adapted to provide a varying index of refraction for said radiation passing internal said first and second radiation transmissive means.

21. A lens deflection system for deflecting radiation emitted from a source comprising:

(a) a first lenticulated radiation transmissive means, comprising a plurality of at least partially transmissive prism members, for transmissively directing said radiation, said first radiation transmissive means having a pair of rear surfaces and directing differentially oriented incident radiation to different ones of said rear surfaces;

(b) second radiation transmissive means for transmissively directing said radiation, said radiation passing from one of said first radiation transmissive means rear surfaces to said to said second radiation transmissive means; and, (c) third radiation transmissive means for transmissively directing said radiation, said radiation passing from the other of said first radiation transmissive means rear surfaces to said third radiation transmissive means.

22. The lens deflection system as recited in claim 21 wherein said second radiation transmissive means includes an at least partially transmissive prism member.

23. The lens deflection system as recited in claim 21 wherein said third radiation transmissive means includes at least a partially transmissive prism member.

24. The lens deflection system as recited in claim 21 where at least one surface of each of said first, second and third transmissive means is lenticulated.

25. The lens deflection system as recited in claim 24 where at least one lenticulated surface of said first radiation transmissive means is contiguously interfaced with at least one lenticulated surface of said second and third radiation transmissive means.

26. The lens deflection system as recited in claim 25 where said index of refraction of at least one of said prism members varies with respect to an extended length of said prism member.

27. The lens deflection system as recited in claim 25 where said index of refraction of at least one of said prism members varies with respect to a direction substantially normal to an extended length of said prism member.

28. The lens deflection system as recited in claim 25 where said index of refraction varies substantially continuously throughout at least a portion of at least one of said lenticulated surfaces.

29. The lens deflection system as recited in claim 25 where said index of refraction varies discretely throughout a portion of at least one of said lenticulated surfaces.

30. The lens deflection system as recited in claim 21 where at least one of said first, second and third transmissive means is formed in closed contour defining at least one chamber therein.

31. The lens deflection system as recited in claim 21 where at least one of said first, second and third transmissive means is formed in a plurality of closed contours defining respective closed contour chambers.

32. The lens deflection system as recited in claims 30 or 31 where at least one chamber is at least partially filled with a solid material composition.

33. The lens deflection system as recited in claims 30 or 31 where at least one chamber is at least partially filled with a liquid composition.

34. The lens deflection system as recited in claims 30 or 31 where at least one chamber is at least partially filled with a gaseous composition.

35. The lens deflection system as recited in claims 30 or 31 where at least one chamber is at least partially filled with a gel composition.

36. The lens deflection system as recited in claims 30 or 31 where at least one chamber is at least partially filled with a plasma composition.

37. The lens deflection system as recited in claims 30 or 31 where at least one chamber is at least partially filled with a predetermined material composition.

38. The lens deflection system as recited in claim 37 including means for reversibly transporting said predetermined material composition into at least one of said chambers.

39. The lens deflection system as recited in claim 37 including means for transporting said predetermined material composition within at least one of said chambers.

40. The lens deflection system as recited in claim 37 including means for transporting said predetermined material composition between at least two of said chambers.

41. The lens deflection system as recited in claim 37 including means for transporting ions of said predetermined material composition.

42. The lens deflection system as recited in claim 37 including at least one osmotic membrane member for allowing transport of at least a portion of said predetermined material composition therethrough.

43. The lens deflection system as recited in claim 21 where at least one of said first, second and third radiation transmissive means includes at least one, at least partially reflective surface.

44. The lens deflection system as recited in claim 21 where at least one of said first, second and third radiation transmissive means includes at least one frontal surface.

45. The lens deflection system as recited in claim 44 where said frontal surface is substantially planar in contour.

46. The lens deflection system as recited in claim 44 where each of said prism members includes said frontal surfaces.

47. The lens deflection system as recited in claim 45 where each of said frontal surface contour planes is substantially coincident each with respect to the other.

48. The lens deflection system as recited in claim 44 where at least one of said first, second and third radiation transmissive means includes at least one rear surface.

49. The lens deflection system as recited in claim 48 where each of said prism member rear surfaces are substantially planar in contour.

50. A lens deflection system for deflecting radiation emitted from a source comprising:
  (a) at least a first transmissive means for transmissively directing said radiation, said first transmissive means having a boundary contour substantially approximating a first tetrahedron element; and,
  (b) at least a second transmissive means for transmissively directing said radiation, said radiation passing from said first transmissive means to said second transmissive means, said first and second transmissive means having indices of refraction which may be varied.

51. The lens deflection system as recited in claim 50 where said second transmissive means includes a boundary contour substantially approximating a second tetrahedron element.

52. The lens deflection system as recited in claim 51 where said first and second transmissive means include at least a pair of surfaces substantially contiguously interfaced each with respect to the other.

53. The lens deflection system as recited in claim 52 including a plurality of tetrahedron elements interfaced each with respect to the other to form a contour substantially approximating a rectangular parallelopiped.

54. A heliostat comprising a plurality of superposed holographic diffraction layers, said holographic diffraction layers, each having a different effect on light rays impinging upon such layer at different angles, said diffraction layers being arranged and the diffractive effect of said layers being selected so that radiation impinging upon said layers at different angles, diffracted by one of said layers, and passing through said superposed layers exits from said superposed layers as parallel rays at substantially the same angle.

* * * * *